(12) United States Patent
Nakamura et al.

(10) Patent No.: US 8,486,572 B2
(45) Date of Patent: Jul. 16, 2013

(54) SYSTEM AND METHOD OF FUEL CELL POWER GENERATION

(75) Inventors: Akinari Nakamura, Katano (JP); Masataka Ozeki, Izumi (JP); Shinji Miyauchi, Nara (JP); Tomonori Asou, Nara (JP)

(73) Assignee: Panasonic Corporation, Osaka (JP)

( * ) Notice: Subject to any disclaimer, the term of this patent is extended or adjusted under 35 U.S.C. 154(b) by 278 days.

(21) Appl. No.: 11/708,460

(22) Filed: Feb. 21, 2007

(65) Prior Publication Data

US 2007/0178337 A1 Aug. 2, 2007

Related U.S. Application Data

(63) Continuation of application No. 10/304,859, filed on Nov. 27, 2002, now Pat. No. 7,192,669.

(30) Foreign Application Priority Data

Nov. 30, 2001 (JP) ................................. 2001-367294

(51) Int. Cl.
*H01M 8/02* (2006.01)
*H01M 8/06* (2006.01)
*H01M 8/18* (2006.01)

(52) U.S. Cl.
USPC ............ 429/428; 429/400; 429/443; 429/456

(58) Field of Classification Search
USPC ..................................... 429/13, 38, 34, 39, 19
See application file for complete search history.

(56) References Cited

U.S. PATENT DOCUMENTS

| | | | |
|---|---|---|---|
| 6,521,204 B1 * | 2/2003 | Borup et al. .................. | 423/652 |
| 6,660,416 B2 | 12/2003 | Sederquist et al. | |
| 6,727,011 B2 | 4/2004 | Suzuki et al. | |
| 6,743,537 B2 | 6/2004 | Shimazu | |
| 6,828,048 B2 | 12/2004 | Margiott et al. | |
| 7,033,687 B2 * | 4/2006 | Ueda et al. ..................... | 429/412 |
| 2001/0018139 A1 * | 8/2001 | Aoyama et al. ................. | 429/19 |
| 2003/0003332 A1 * | 1/2003 | Sederquist et al. ............. | 429/19 |
| 2003/0064259 A1 * | 4/2003 | Gittleman ....................... | 429/17 |
| 2003/0093950 A1 * | 5/2003 | Goebel et al. ............... | 48/197 R |

FOREIGN PATENT DOCUMENTS

| | | | |
|---|---|---|---|
| EP | 1 120 844 A2 | | 8/2001 |
| JP | 59-073854 | | 4/1984 |
| JP | 61-088461 | * | 5/1986 |
| JP | 01-159966 | | 6/1989 |
| JP | 02-30068 | * | 1/1990 |
| JP | 02-030068 | | 1/1990 |
| JP | 03-257762 | | 11/1991 |
| JP | 07-85882 | | 3/1995 |
| JP | 8-078037 | | 3/1996 |
| JP | 2002-277137 | | 10/2000 |
| JP | P2000-277137 A | | 10/2000 |

* cited by examiner

*Primary Examiner* — Barbara Gilliam
*Assistant Examiner* — Angela Martin
(74) *Attorney, Agent, or Firm* — McDermott Will & Emery LLP

(57) ABSTRACT

A fuel cell power generation system includes a fuel gas generating means for generating a hydrogen-rich fuel gas from a source material having, as a main ingredient, a compound containing carbon and hydrogen; a source material supply source for supplying a source material to the fuel gas generating means; a fuel gas supply means for supplying the fuel gas from the fuel gas generating means to a fuel gas flow channel of a fuel cell at which channel a fuel electrode is placed; and a bypass means for supplying the source material from the source material supply source to the fuel gas flow channel, bypassing the fuel gas generating means. At least at one of time periods before start of and after end of power generation, the source material, as a displacement gas, is injected into the fuel gas flow channel of the fuel cell via the bypass means.

10 Claims, 16 Drawing Sheets

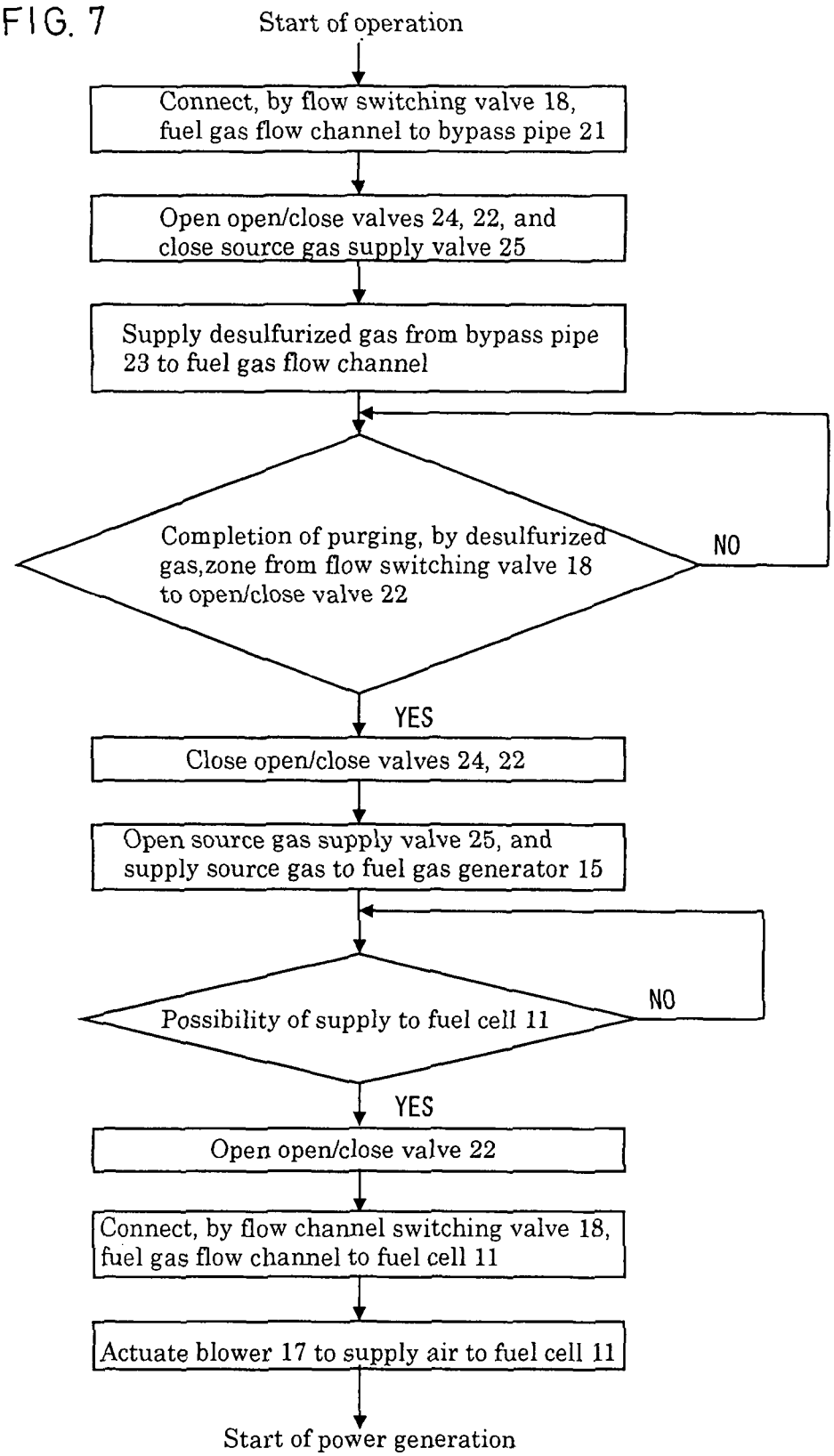

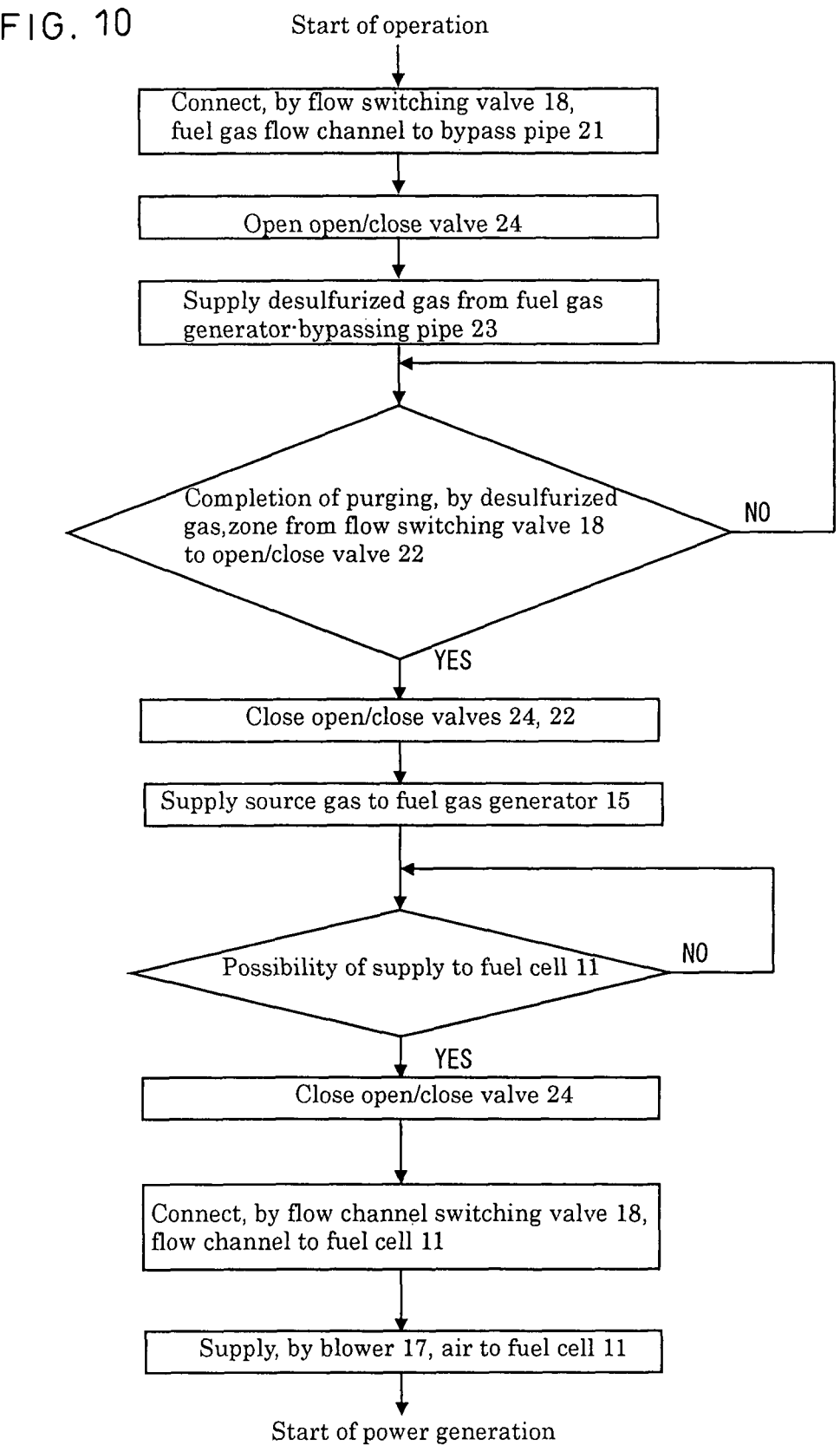

SYSTEM AND METHOD OF FUEL CELL POWER GENERATION

RELATED APPLICATIONS

This application is a continuation of application Ser. No. 10/304,859, filed Nov. 27, 2002 now U.S. Pat. No. 7,192,669, which claims priority from Japanese Patent Application No. 2001-367294, filed Nov. 30, 2001, the contents of which applications are hereby incorporated by reference.

BACKGROUND OF THE INVENTION

The present invention relates to a system and method of fuel cell power generation, in which electric power is generated by using a fuel cell.

According to prior art, such system or method of fuel cell power generation as shown in e.g. FIG. 20 and described in Japanese Laid-open Patent Publication Hei 3-257762 was employed. Referring thereto, it comprises: a fuel cell 1; a desulfurizer 3 for removing sulfur content from a source gas such as natural gas; a fuel gas generator 2 for generating a hydrogen-rich gas from the desulfurized source gas, having a reactor 2a therefor and a burner 2b to heat the reactor 2a; and a nitrogen equipment 5 connected to a position upstream of the fuel gas generator 2 by a nitrogen supply pipe 7 having a shut-off valve 6. The fuel generated by the fuel generator 2 is supplied to a fuel electrode 1a of the fuel cell 1 via a reformed gas supply pipe 8, while the residual fuel is supplied to the burner 2b via a hydrogen exhausting connection pipe 9. To an oxidant electrode of the fuel cell, air is supplied by a blower 4.

When power generation is to be stopped according to general systems or methods of fuel cell power generation, supply of a source gas is firstly stopped. The phenomena occurring then can be described as follows with reference to FIG. 20. In a flow channel from the fuel gas generator 2 to the hydrogen exhausting connection pipe 9 via the reformed gas supply pipe 8 and the fuel cell 1, a hydrogen-rich gas is retained particularly in the flow channel from the fuel electrode 1a to the hydrogen exhausting connection pipe 9. Accordingly, there is a fear in such system that when air flows into the hydrogen-rich gas flow channel, due to free convection, from the burner 2b released to atmosphere, the hydrogen may explode.

To solve this problem, when the power generation is to be stopped according to the system or method of fuel cell power generation as described in above described Japanese Laid-open Patent Publication Hei 3-257762 and shown in FIG. 20, the shut-off valve 6 is opened, and nitrogen gas, as an inert gas, is injected, from the nitrogen equipment 5 and then via the nitrogen supply pipe 7, into the gas flow channel from the fuel gas generator 2 to the hydrogen exhausting connection pipe 9 via the reformed gas supply pipe 8 and the fuel cell 1, particularly to the gas flow channel from the fuel electrode 1a to the hydrogen gas exhausting connection pipe 9. Thereby, the hydrogen-rich gas is exhausted, namely purged, from such fuel gas flow channel by the nitrogen gas. The purged hydrogen-rich gas is then burned by the burner 2b. According to conventional systems in such manner, hydrogen explosion is prevented, before it happens, by the purging process of purging the hydrogen-rich gas from the fuel gas flow channel by the nitrogen gas, whereby safety is secured.

A drawback in the conventional systems or methods of fuel cell power generation is that a nitrogen equipment, such as a nitrogen cylinder, is needed for above described purging process by the nitrogen gas. Thus, when it is used for distributed power generation of stationary type for domestic use or for power sources for electric vehicles, there are such problems that a large space and a high initial cost are needed. Other problems are that it needs periodical replacement or replenishment of the nitrogen cylinder as well as high running costs.

Furthermore, at start-up or initial stage of the operation of the fuel gas generator, highly dense carbon monoxide is contained in the generated fuel gas. In the case that the fuel cell is of a solid polymer electrolyte fuel cell, the carbon monoxide poisons a catalyst of the fuel electrode of the fuel cell. However, according to the conventional systems or methods of fuel cell power generation, such fuel gas as containing highly dense carbon monoxide is supplied to the fuel cell, so that the performance of the fuel cell is likely to get deteriorated due to the poisoning of the catalyst of the fuel electrode.

BRIEF SUMMARY OF THE INVENTION

In view of the problems of the conventional systems or methods of fuel cell power generation, it is thus an object of the present invention to provide a system and a method of fuel cell power generation, which makes it possible to purge a hydrogen-rich gas from a fuel gas flow channel without using a nitrogen gas before start of and/or after end of power generation, namely at least at one of time periods before start of and after end of power generation.

It is another object of the present invention to provide a system and a method of fuel cell power generation, which can prevent highly dense carbon monoxide from flowing into the fuel cell at start of the fuel cell system operation.

A system of fuel cell power generation according to a first aspect of the present invention is structured to comprise: a fuel cell having a fuel gas flow channel and a fuel electrode placed at an atmosphere of the fuel gas flow channel; a fuel gas supply means for supplying a fuel gas to the fuel gas flow channel; and a displacement gas supply means for supplying, to the fuel gas flow channel, a displacement gas having, as a main ingredient, a compound containing carbon and hydrogen, wherein at least at one of time periods before start of and after end of power generation by the fuel cell, the displacement gas is injected into the fuel gas flow channel for displacing the atmosphere of the fuel gas flow channel by the displacement gas.

In this system of fuel cell power generation according to the first aspect of the present invention, a preferable manner is such that the system further comprises an air supply means for supplying an air to the fuel gas flow channel thereby to displace the atmosphere of the fuel gas flow channel by the air, wherein after the end of power generation, the displacement gas is injected into the fuel gas flow channel by the displacement gas supply means thereby to displace the atmosphere of the fuel gas flow channel by the displacement gas, and thereafter the air is injected into the atmosphere of the fuel gas flow channel by the air supply means thereby to displace the atmosphere of the fuel gas flow channel by the air.

A method of fuel cell power generation according to a first aspect of the present invention uses a fuel cell having a fuel gas flow channel and a fuel electrode placed at an atmosphere of the fuel gas flow channel, the method comprising: a fuel gas supply step of supplying a fuel gas to the fuel gas flow channel; and a first displacement step of injecting, at least at one of time periods before start of and after end of power generation by the fuel cell, a displacement gas having, as a main ingredient, a compound containing carbon and hydrogen, into the fuel gas flow channel thereby to displace the atmosphere of the fuel gas flow channel by the displacement gas.

In this method of fuel cell power generation according to the first aspect of the present invention, a preferable manner is such that the method further comprises a second displacement step, subsequent to the first displacement step after the end of power generation, of injecting an air to the fuel gas flow channel thereby to displace the atmosphere of the fuel gas flow channel by the air.

A system of fuel cell power generation according to a second aspect of the present invention comprises: a fuel cell having a fuel gas flow channel and a fuel electrode placed at an atmosphere of the fuel gas flow channel; a fuel gas generating means for generating a hydrogen-rich fuel gas from a source material having, as a main ingredient, a compound containing carbon and hydrogen; a source material supply source for supplying the source material to the fuel gas generating means; a fuel gas supply means for supplying the fuel gas from the fuel gas generating means to the fuel gas flow channel; and a bypass means for supplying the source material from the source material supply source to the fuel gas flow channel in the form of a source gas, bypassing the fuel gas generating means, wherein at least at one of time periods before start of and after end of power generation by the fuel cell, the source gas is injected into the fuel gas flow channel via the bypass means thereby to displace the atmosphere of the fuel gas flow channel by the source gas.

In this system of fuel cell power generation according to the second aspect of the present invention, a preferable manner is such that the system further comprises an air supply means for supplying an air to the fuel gas flow channel thereby to displace the atmosphere of the fuel gas flow channel by the air, wherein after the end of power generation, the source gas is injected by the bypass means into the fuel gas flow channel thereby to displace the atmosphere of the fuel gas flow channel by the source gas, and thereafter the air is injected by the air supply means into the atmosphere of the fuel gas flow channel thereby to displace the atmosphere of the fuel gas flow channel by the air.

A method of fuel cell power generation according to the second aspect of the present invention uses a fuel cell having a fuel gas flow channel and a fuel electrode placed at an atmosphere of the fuel gas flow channel, the method comprising: a fuel gas generating step of generating a hydrogen-rich fuel gas from a source material having, as a main ingredient, a compound containing carbon and hydrogen; a fuel gas supply step of supplying the fuel gas to the fuel gas flow channel; and a first displacement step of supplying the source material, in the form of a source gas, directly to the fuel gas flow channel thereby to displace the atmosphere of the fuel gas flow channel by the fuel gas, wherein the first displacement step is performed at least at one of time periods before start of and after end of power generation of the fuel cell.

In this method of fuel cell power generation according to the second aspect of the present invention, a preferable manner is such that the method further comprises a second displacement step, subsequent to the first displacement step after the end of power generation, of injecting an air into the fuel gas flow channel thereby to displace the atmosphere of the fuel gas flow channel by the air.

A system of fuel cell power generation according to a third aspect of the present invention comprises: a fuel cell having a fuel gas flow channel and a fuel electrode placed at an atmosphere of the fuel gas flow channel; a fuel gas generating means for generating a hydrogen-rich fuel gas from a source material having, as a main ingredient, a compound containing carbon and hydrogen; a source material supply source for supplying the source material to the fuel gas generating means; a fuel gas supply means for supplying the fuel gas from the fuel gas generating means to the fuel gas flow channel; and a displacement gas supply means for supplying, to the fuel gas flow channel, a displacement gas having, as a main ingredient, a compound containing carbon and hydrogen thereby to displace the atmosphere of the fuel gas flow channel by the displacement gas, wherein in an arbitrary time interval selected from between start of operation of the system of fuel cell power generation and start of power generation by the fuel cell, the displacement gas is injected by the displacement gas supply means into the fuel gas flow channel thereby to displace the atmosphere of the fuel gas flow channel by the displacement gas.

A method of fuel cell power generation according to the third aspect of the present invention uses a fuel cell having a fuel gas flow channel and a fuel electrode placed at an atmosphere of the fuel gas flow channel, the method comprising: a fuel gas generating step of generating a hydrogen-rich fuel gas from a source material having, as a main ingredient, a compound containing carbon and hydrogen; a fuel gas supply step of supplying the fuel gas to the fuel gas flow channel; a first displacement step of supplying, to the fuel gas flow channel, a displacement gas having, as a main ingredient, a compound containing carbon and hydrogen thereby to displace the atmosphere of the fuel gas flow channel by the displacement gas, wherein the first displacement step is performed in an arbitrary time interval selected from between start of operation of the method of fuel cell power generation and start of power generation by the fuel cell.

While the novel features of the present invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 7 is a flow chart showing an example of a process of starting the operation of the system of fuel cell power generation according to EMBODIMENT MODE 3 of the present invention.

FIG. 10 is a flow chart showing another example of a process of starting the operation of the system of fuel cell power generation according to EMBODIMENT MODE 3 of the present invention.

DETAILED DESCRIPTION OF THE INVENTION

Figure 1:
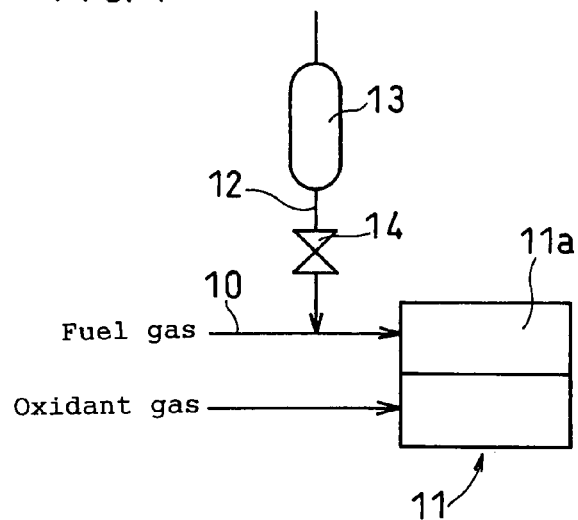
FIG. 1 is a diagram schematically showing a structure of a system of fuel cell power generation according to EMBODIMENT MODE 1 of the present invention.

A system of fuel cell power generation according to a first aspect of the present invention is structured to comprise: a fuel cell having a fuel gas flow channel and a fuel electrode placed at an atmosphere of the fuel gas flow channel; a fuel gas supply means for supplying a fuel gas to the fuel gas flow channel; and a displacement gas supply means for supplying, to the fuel gas flow channel, a displacement gas having, as a main ingredient, a compound containing carbon and hydrogen, wherein at least one of time periods before start of and after end of power generation by the fuel cell, the displacement gas is injected into the fuel gas flow channel for displacing the atmosphere of the fuel gas flow channel by the displacement gas.

Likewise, a method of fuel cell power generation according to the first aspect of the present invention uses a fuel cell having a fuel gas flow channel and a fuel electrode placed at an atmosphere of the fuel gas flow channel, the method comprising: a fuel gas supply step of supplying a fuel gas to the fuel gas flow channel; and a first displacement step of injecting, at least at one of time periods before start of and after end of power generation by the fuel cell, a displacement gas having, as a main ingredient, a compound containing carbon and hydrogen, into the fuel gas flow channel thereby to displace the atmosphere of the fuel gas flow channel by the displacement gas.

According to such system and method of fuel cell power generation, the atmosphere of the fuel gas flow channel of the fuel cell, at which the fuel electrode is placed, is purged by the displacement gas at least at one of time periods before the start of and after the end of power generation of the fuel cell, so that there is no danger that residual fuel gas in the fuel cell may contact air, and that there is no fear that the fuel gas may explode in the inside of the fuel cell.

In the system of fuel cell power generation according to the first aspect of the present invention, a preferable manner is such that the system further comprises an air supply means for supplying an air to the fuel gas flow channel thereby to displace the atmosphere of the fuel gas flow channel by the air, wherein after the end of power generation, the displacement gas is injected into the fuel gas flow channel by the displacement gas supply means thereby to displace the atmosphere of the fuel gas flow channel by the displacement gas, and thereafter the air is injected into the atmosphere of the fuel gas flow channel by the air supply means thereby to displace the atmosphere of the fuel gas flow channel by the air.

Likewise, in the method of fuel cell power generation according to the first aspect of the present invention, a preferable manner is such that the method further comprises a second displacement step, subsequent to the first displacement step after the end of power generation, of injecting an air to the fuel gas flow channel thereby to displace the atmosphere of the fuel gas flow channel by the air.

According to such preferable manner of the system and method of fuel cell power generation, the atmosphere of the fuel gas flow channel of the fuel cell, at which the fuel electrode is placed, is purged by the displacement gas, and thereafter the displacement gas is further purged by air, so that the fuel cell can be kept at a very safe condition after the end of the operation of the system of fuel cell power generation. Further, since the fuel gas substantially does not contact air, there is no fear of explosion in the inside of the fuel cell.

In the system of fuel cell power generation according to the first aspect of the present invention, another preferable manner is such that the fuel gas supply means comprises: a fuel gas generating means for generating a hydrogen-rich fuel gas from a source material having, as a main ingredient, a compound containing carbon and hydrogen; and a source material supply source for supplying the source material to the fuel gas generating means, wherein the fuel gas generating means continues the fuel gas generation until the injection of the displacement gas into the fuel gas flow channel by the displacement gas supply means is ended.

In the method of fuel cell power generation according to the first aspect of the present invention, another preferable manner is such that the fuel gas supply step comprises a fuel gas generating step of generating a hydrogen-rich gas, as the fuel gas, from a source material having, as a main ingredient, a compound containing carbon and hydrogen, wherein the fuel gas is generated at the fuel gas generating step until the injection of the displacement gas to the fuel gas flow channel at the first displacement step is ended.

According to such another preferable manner of the system and method of fuel cell power generation, stable fuel gas generation, more specifically stable burning of the burner for heating the reactor in the fuel gas generating means, can be realized, until the displacement, by the displacement gas, of the atmosphere of the fuel gas flow channel of the fuel cell, at which the fuel electrode is placed, is ended.

In the system or method of fuel cell power generation according to the first aspect of the present invention, a still another preferable manner is such that the system or method further comprises a steam supply means or displacement step by a steam (third displacement step) for supplying a steam to the fuel gas generating means thereby to displace, by the steam, inside atmosphere of the fuel gas generating means, which is to generate a hydrogen-rich fuel gas from a source material having, as a main ingredient, a compound containing carbon and hydrogen.

After the end of power generation, the displacement gas is injected into the fuel gas flow channel by the displacement gas supply means thereby to displace the atmosphere of the fuel gas flow channel by the displacement gas, and thereafter the fuel gas generation by the fuel gas generating means is stopped, and the steam is injected into inside of the fuel gas generating means by the steam supply means thereby to displace the inside atmosphere of the fuel gas generating means by the steam.

Or else, after the end of power generation, the fuel gas generation by the fuel gas generating means is stopped, and the steam is injected into the inside of the fuel gas generating means thereby to displace the inside atmosphere of the fuel gas generating means by the steam, and also the displacement gas is injected into the fuel gas flow channel by the displacement gas supply means thereby to further displace the atmosphere of the fuel gas flow channel by the displacement gas. That is, after the end of power generation, the fuel gas generating step by the fuel gas generating means is stopped, and the first displacement step and the third displacement step are performed.

According to such still another preferable manner of the system and method of fuel cell power generation, the fuel gas flow channel retains therein substantially no flammable gas any longer owing to the purging, by the steam, of the inside atmosphere of the fuel gas generating means. Further, by the injection of the steam into the fuel gas generating means, the cooling of the fuel gas generating means is promoted, whereby the operation of the system can be ended in a short time. Furthermore, by independently performing the injection of the steam into the fuel gas generating means and the injection of the displacement gas into the fuel gas flow channel at which the fuel electrode of the fuel cell is placed, the displacements can be done in a short time.

In the system of fuel cell power generation according to the first aspect of the present invention, a further preferable manner is such that the system further comprises an air supply means for supplying an air to the fuel gas flow channel and to the fuel gas generating means thereby to displace the atmosphere of the fuel gas flow channel and the inside atmosphere of the fuel gas generating means, wherein the displacement gas is injected into the fuel gas flow channel thereby to displace the atmosphere of the fuel gas flow channel by the displacement gas, and the steam is injected into the inside of the fuel gas generating means thereby to displace the inside atmosphere of the fuel gas generating means by the steam, and thereafter the air is injected into both of the fuel gas flow channel and the inside of the fuel gas generating means by the air supply means thereby to displace the atmosphere of the fuel gas flow channel and the inside atmosphere of the fuel gas generating means by the air. Thereby, both of the atmosphere of the fuel gas flow channel and the inside atmosphere of the fuel gas generating means can be displaced by the air.

Here, the injection of the air is preferably performed in such a manner that the air is injected, by the air supply means, to the fuel gas generating means and then in series thereto to the fuel gas flow channel, or else that the air is injected, by the air supply means, in parallel to the fuel gas generating means and the fuel gas flow channel. According to the former manner, the atmosphere of the fuel gas flow channel can be displaced by the air continuously along the fuel gas flow channel from an upstream portion to a downstream portion thereof. On the other hand, according to the latter manner, the atmosphere of the fuel gas flow channel can be displaced by the air in a short time.

In the system of fuel cell power generation according to the first aspect of the present invention, a still further preferable manner is such that the fuel gas generating means comprises: a shifter provided with a shifting catalyst having at least a noble metal and a metal oxide as constituting materials thereof; and a hydrogen gas supplier for supplying, to the shifter, a hydrogen gas containing at least carbon monoxide and a steam as auxiliary ingredients thereof. Thereby, the inside of the fuel gas generating means gets to have a higher resistance to oxidation, so that any problem of oxidation is unlikely to occur, even if air is injected to such inside.

Next, a system of fuel cell power generation according to a second aspect of the present invention comprises: a fuel cell having a fuel gas flow channel and a fuel electrode placed at an atmosphere of the fuel gas flow channel; a fuel gas generating means for generating a hydrogen-rich fuel gas from a source material having, as a main ingredient, a compound containing carbon and hydrogen; a source material supply source for supplying the source material to the fuel gas generating means; a fuel gas supply means for supplying the fuel gas from the fuel gas generating means to the fuel gas flow channel; and a bypass means for supplying the source material from the source material supply source to the fuel gas flow channel in the form of a source gas, bypassing the fuel gas generating means, wherein at least at one of time periods before start of and after end of power generation by the fuel cell, the source gas is injected into the fuel gas flow channel via the bypass means thereby to displace the atmosphere of the fuel gas flow channel by the source gas.

Likewise, a method of fuel cell power generation according to the second aspect of the present invention uses a fuel cell having a fuel gas flow channel and a fuel electrode placed at an atmosphere of the fuel gas flow channel, the method comprising: a fuel gas generating step of generating a hydrogen-rich fuel gas from a source material having, as a main ingredient, a compound containing carbon and hydrogen; a fuel gas supply step of supplying the fuel gas to the fuel gas flow channel; and a first displacement step of supplying the source material, in the form of a source gas, directly to the fuel gas flow channel thereby to displace the atmosphere of the fuel gas flow channel by the fuel gas, wherein the first displacement step is performed at least at one of time periods before start of and after end of power generation of the fuel cell.

According to such system and method of fuel cell power generation, the atmosphere of the fuel gas flow channel of the fuel cell, at which the fuel electrode is placed, is purged by the displacement gas at least at one of time periods before the start of and after the end of power generation of the fuel cell, so that there is no danger that residual fuel gas in the fuel cell may contact air, and that there is no fear that the fuel gas may explode in the inside of the fuel cell. Furthermore, the system can be simple and efficient, since the gas for thereby purging the atmosphere to be purged is supplied from the same supply source as for the source material.

In the system of fuel cell power generation according to the second aspect of the present invention, a preferable manner is such that the system further comprises an air supply means for supplying an air to the fuel gas flow channel thereby to displace the atmosphere of the fuel gas flow channel by the air, wherein after the end of power generation, the source gas is injected by the bypass means into the fuel gas flow channel thereby to displace the atmosphere of the fuel gas flow channel by the source gas, and thereafter the air is injected by the air supply means into the atmosphere of the fuel gas flow channel thereby to displace the atmosphere of the fuel gas flow channel by the air.

Likewise, in the method of fuel cell power generation according to the second aspect of the present invention, a preferable manner is such that the method further comprises a second displacement step, subsequent to the first displacement step after the end of power generation, of injecting an air to the fuel gas flow channel thereby to displace the atmosphere of the fuel gas flow channel by the air.

According to such preferable manner of the system and method of fuel cell power generation, the atmosphere of the fuel gas flow channel, at which the fuel electrode is place, is purged by the source gas, and thereafter the source gas is purged by the air, so that the fuel cell can be kept at a very safe condition after the end of the operation of the system. Further, since the fuel gas substantially does not contact air, there is no fear of explosion in the inside of the fuel cell.

In the system of fuel cell power generation according to the second aspect of the present invention, another preferable manner is such that the fuel gas generating means continues the fuel gas generation until the injection of the source gas into the fuel gas flow channel by the bypass means is ended.

Likewise, in the method of fuel cell power generation according to the second aspect of the present invention, another preferable manner is such that the fuel gas is generated at the fuel gas generating step until the injection of the source gas into the fuel gas flow channel at the first displacement step is ended.

According to such another preferable manner of the system and method of fuel cell power generation, stable fuel gas generation, more specifically stable burning of the burner for heating the reactor in the fuel gas generating means, can be realized, until the displacement, by the displacement gas, of the atmosphere of the fuel gas flow channel of the fuel cell, at which the fuel electrode is placed, is ended.

In the system of fuel cell power generation according to the second aspect of the present invention, the system further comprises a steam supply means for supplying a steam to the fuel gas generating means thereby to displace inside atmosphere of the fuel gas generating means by the steam, wherein after the end of power generation, the source gas is injected by the bypass means into the fuel gas flow channel thereby to displace the atmosphere of the fuel gas flow channel by the source gas, and thereafter the fuel gas generation by the fuel gas generating means is stopped, and the steam is injected by the steam supply means into the inside of the fuel gas generating means thereby to displace the inside atmosphere of the fuel gas generating means by the steam.

Or else, the system further comprises a steam supply means for supplying a steam to the fuel gas generating means thereby to displace inside atmosphere of the fuel gas generating means by the steam, wherein after the end of power generation, the fuel gas generation by the fuel gas generating means is stopped, and the steam is injected by the steam supply means into the inside of the fuel gas generating means thereby to displace the inside atmosphere of the fuel gas generating means by the steam, and further the source gas is injected by the bypass means into the fuel gas flow channel thereby to displace the atmosphere of the fuel gas flow channel by the source gas.

Likewise, in the method of fuel cell power generation according to the second aspect of the present invention, a still another preferable manner is such that the fuel gas generation at the fuel gas supply step is performed by using a fuel gas generating means, and the method further comprises a third displacement step of supplying a steam to the fuel gas generating means thereby to displace inside atmosphere of the fuel gas generating means by the steam, wherein after the end of power generation, the fuel gas generating step by the fuel gas generating means is stopped, and the first displacement step and the third displacement step are performed.

According to such still another preferable manner of the system and method of fuel cell power generation, the fuel gas flow channel retains therein substantially no flammable gas any longer owing to the purging, by the steam, of the inside atmosphere of the fuel gas generating means. Further, by the injection of the steam into the fuel gas generating means, the cooling of the fuel gas generating means is promoted, whereby the operation of the system can be ended in a short time. Furthermore, by independently performing the injection of the steam into the fuel gas generating means and the injection of the displacement gas into the fuel gas flow channel at which the fuel electrode of the fuel cell is placed, the displacements can be done in a short time.

In the system of fuel cell power generation according to the second aspect of the present invention, a further preferable manner is such that the system further comprises an air supply means for supplying an air to the fuel gas flow channel and to the fuel gas generating means thereby to displace the atmosphere of the fuel gas flow channel and the inside atmosphere of the fuel gas generating means by the air, wherein the source gas is injected into the fuel gas flow channel thereby to displace the atmosphere of the fuel gas flow channel by the source gas, and the steam is injected into the inside of the fuel gas generating means thereby to displace the inside atmosphere of the fuel gas generating means by the steam, and thereafter the air is injected by the air supply means into both of the fuel gas flow channel and the inside of the fuel gas generating means thereby to displace the atmosphere of the fuel gas flow channel and the inside atmosphere of the fuel gas generating means by the air. Thereby, the atmosphere of the whole flow channel of the source material and the fuel gas in the system can be displaced by the air.

Here, the injection of the air is preferably performed in such a manner that the air is injected, by the air supply means, to the fuel gas generating means and then in series thereto to the fuel gas flow channel, or else that the air is injected, by the air supply means, in parallel to the fuel gas generating means and the fuel gas flow channel. According to the former manner, the atmosphere of the fuel gas flow channel can be displaced by the air continuously along the fuel gas flow channel from an upstream portion to a downstream portion thereof. On the other hand, according to the latter manner, the atmosphere of the fuel gas flow channel can be displaced by the air in a short time.

In the system of fuel cell power generation according to the second aspect of the present invention, a still further preferable manner is such that the fuel gas generating means comprises: a shifter provided with a shifting catalyst having at least a noble metal and a metal oxide as constituting materials thereof; and a hydrogen gas supplier for supplying, to the shifter, a hydrogen gas containing at least carbon monoxide and a steam as auxiliary ingredients thereof. Thereby, the inside of the fuel gas generating means gets to have a higher resistance to oxidation, so that any problem of oxidation is unlikely to occur, even if air is injected to such inside.

A system of fuel cell power generation according to a third aspect of the present invention comprises: a fuel cell having a fuel gas flow channel and a fuel electrode placed at an atmosphere of the fuel gas flow channel; a fuel gas generating means for generating a hydrogen-rich fuel gas from a source material having, as a main ingredient, a compound containing carbon and hydrogen; a source material supply source for supplying the source material to the fuel gas generating means; a fuel gas supply means for supplying the fuel gas from the fuel gas generating means to the fuel gas flow channel; and a displacement gas supply means for supplying, to the fuel gas flow channel, a displacement gas having, as a main ingredient, a compound containing carbon and hydrogen thereby to displace the atmosphere of the fuel gas flow channel by the displacement gas, wherein in an arbitrary time interval selected from between start of operation of the system of fuel cell power generation and start of power generation by the fuel cell, the displacement gas is injected by the displacement gas supply means into the fuel gas flow channel thereby to displace the atmosphere of the fuel gas flow channel by the displacement gas.

Further, in the system of fuel cell power generation according to the third aspect of the present invention, a preferable manner is such that the displacement gas supply means is a means for supplying the source material, as the displacement gas, from the source material supply source to the fuel gas flow channel, bypassing the fuel gas generating means.

Likewise, a method of fuel cell power generation according to the third aspect of the present invention uses a fuel cell having a fuel gas flow channel and a fuel electrode placed at an atmosphere of the fuel gas flow channel, the method comprising: a fuel gas generating step of generating a hydrogen-rich fuel gas from a source material having, as a main ingredient, a compound containing carbon and hydrogen; a fuel gas supply step of supplying the fuel gas to the fuel gas flow channel; a first displacement step of supplying, to the fuel gas flow channel, a displacement gas having, as a main ingredient, a compound containing carbon and hydrogen thereby to displace the atmosphere of the fuel gas flow channel by the displacement gas, wherein the first displacement step is performed in an arbitrary time interval selected from between start of operation of the method of fuel cell power generation and start of power generation by the fuel cell.

According to such system and the preferable manner thereof and such method of fuel cell power generation, there is no danger that residual fuel gas in the fuel cell may contact air, and that there is no fear that the fuel gas may explode in the inside of the fuel cell. Further, such system and method can solve the problem in prior art that a fuel gas containing highly dense carbon monoxide at an initial stage of the operation of the fuel gas generator or generating means may diffuse and flow into the fuel gas flow channel, at which the fuel electrode is placed, thereby to poison the fuel electrode.

In the above systems of fuel cell power generation and preferable manners thereof, a yet another preferable manner is such that the system further comprises a carbon monoxide density detecting means for detecting a carbon monoxide density contained in the fuel gas to indicate a detected value of the carbon monoxide density, wherein the displacement gas or the source gas, as the displacement gas, is injected into the fuel gas flow channel until the detected value by the carbon monoxide density detecting means becomes lower than a predetermined value. Thereby, such problem can be solved that a fuel gas containing highly dense carbon monoxide at an initial stage of the operation of the fuel gas generator or generating means may diffuse and flow into the fuel gas flow channel, at which the fuel electrode is placed, thereby to poison the fuel electrode.

Further, in the above systems of fuel cell power generation and preferable manners thereof, a still further preferable manner is such that the displacement gas is free of sulfur content.

Thereby, the catalyst of the fuel electrode can be prevented from being poisoned.

Furthermore, in the above systems of fuel cell power generation and preferable manners thereof, a yet further preferable manner is such that the source material supplied from the source material supply source is a town gas having been made free of sulfur content. Thereby, the source material can be easily utilized, and the catalyst of the fuel electrode can be prevented from being poisoned.

Hereinafter, several EMBODIMENT MODEs of the present invention are described with reference to appended drawings.

EMBODIMENT MODE 1

FIG. 1 schematically shows a structure of a system of fuel cell power generation according to the present EMBODIMENT MODE 1 of the present invention. Referring thereto, the system of the present EMBODIMENT MODE comprises: a fuel cell 11; a fuel supply for supplying a fuel gas to a fuel electrode 11a of the fuel cell; an oxidant gas supply for supplying an oxidant gas to an oxidant electrode (not shown) of the fuel cell; and a desulfurized gas supply pipe 12 for supplying, to a fuel gas supply pipe 10, a desulfurized gas, as a displacement gas, made by removing sulfur content from a town gas. The displacement gas here has, as a main ingredient, a compound, such as hydrocarbon, containing carbon and hydrogen.

Further, the desulfurized gas supply pipe 12 is provided with a desulfurizer 13 for removing sulfur content from a source material such as a town gas containing sulfur content, thereby to make a displacement gas, and also provided with an open/close valve 14 for supplying and shutting-off the desulfurized gas. In the present EMBODIMENT MODE, a town gas is used as the source material having, as the main ingredient, a compound containing carbon and hydrogen. A representative town gas contains methane as a main ingredient, and butane as a minor ingredient.

The operation of the system of fuel cell power generation according to the present EMBODIMENT MODE will be described hereafter. For generating an electric power, firstly the open/close valve 14 is opened for injecting the desulfurized gas made of the town gas, with its sulfur content having been removed by the desulfurizer 13, to the fuel electrode 11a of the fuel cell 11 via the desulfurized gas supply pipe 12 and via the fuel gas supply pipe 10. Thereby, residual gas then existing at and in the vicinity of the fuel electrode 11a is exhausted to outside of the fuel cell 11, and thus the atmosphere of the fuel gas flow channel of the inside of the fuel cell, at which the fuel electrode 11a is placed, is purged by the desulfurized gas. Here in the present specification, the term "purge" is used to mean "exhaust", and in other words furthermore to mean "displace a material, such as a gas, existing in a certain space by a further material, such as a further gas, to be used for purging".

After the purging, by the desulfurized gas, of the atmosphere of the fuel gas flow channel, at which the fuel electrode 11a is placed, is completed, the open/close valve is closed thereby to stop the supply of the desulfurized gas, so that the fuel gas and the oxidant gas are supplied to the fuel cell 11, thereby to start power generation. On the other hand, in order to stop the power generation, first of all, the supply of the fuel gas and the oxidant gas to the fuel cell 11 is stopped. Next, the open/close valve 14 is opened, and the desulfurized gas is injected to the fuel electrode 11a of the fuel cell in a manner similar to that before the start of the power generation.

Thereby, unreacted fuel gas is exhausted to the outside of the fuel cell 11, and thus the atmosphere of the fuel gas flow channel of the fuel cell, at which the fuel electrode 11a is placed, is purged.

The fuel gas supplied to the fuel electrode 11a of the fuel cell 11 is a hydrogen-rich gas, so that there is a danger of explosion if the fuel gas directly contacts with air. When the power generation of the fuel cell 11 is kept stopped for a while, air from the outside of the fuel cell is likely to flow in to the fuel electrode 11a of the fuel cell 11 via e.g. pipes. However, in the case of the structure of the fuel cell power generation according to the present EMBODIMENT MODE, the atmosphere of the fuel gas flow channel, at which the fuel electrode 11a is placed, is firstly purged by the desulfurized gas before the start of the power generation, and thereafter the fuel gas is supplied to the fuel electrode 11a of the fuel cell 11. For ending the power generation, the supply of the fuel gas to the fuel electrode 11a of the fuel cell 11 is stopped, and thereafter the atmosphere of the fuel gas flow channel, at which the fuel electrode 11a of the fuel cell 11 is placed, is purged by the desulfurized gas.

Accordingly, there is no danger for the residual fuel gas inside the fuel cell 11 to contact air, so that there is no fear for the fuel gas to get exploded at the inside of the fuel cell 11. In other words, according to the present EMBODIMENT MODE, safe starting and stopping of the fuel cell power generation can be realized without any supply of nitrogen.

In this connection, it is generally known that a flammable range in the mixture gas of hydrogen and air is 4 to 75 volume % of hydrogen. Depending on cases, no burning or no explosion may occur even within such flammable range, but occurrence of such flammable range should basically be avoided. Therefore, care needs to be taken so that the amount of the hydrogen gas does not fall within such flammable range in above described purging process or in purging processes in other EMBODIMENT MODEs, which will be described later.

In the above description, such purging processes have been described as to purge, by the desulfurized gas, the atmosphere of the fuel gas flow channel of the fuel cell at which the fuel electrode is placed, both before start of and after end of the power generation. However, if the purging is performed only before the start of power generation, the effect obtained thereby as described above with the description of operation thereof can be independently obtained. Similarly, if the purging is performed only after the end of power generation, the effect obtained thereby as described above with respect to the description of operation thereof can be independently obtained.

EMBODIMENT MODE 2

Figure 2:
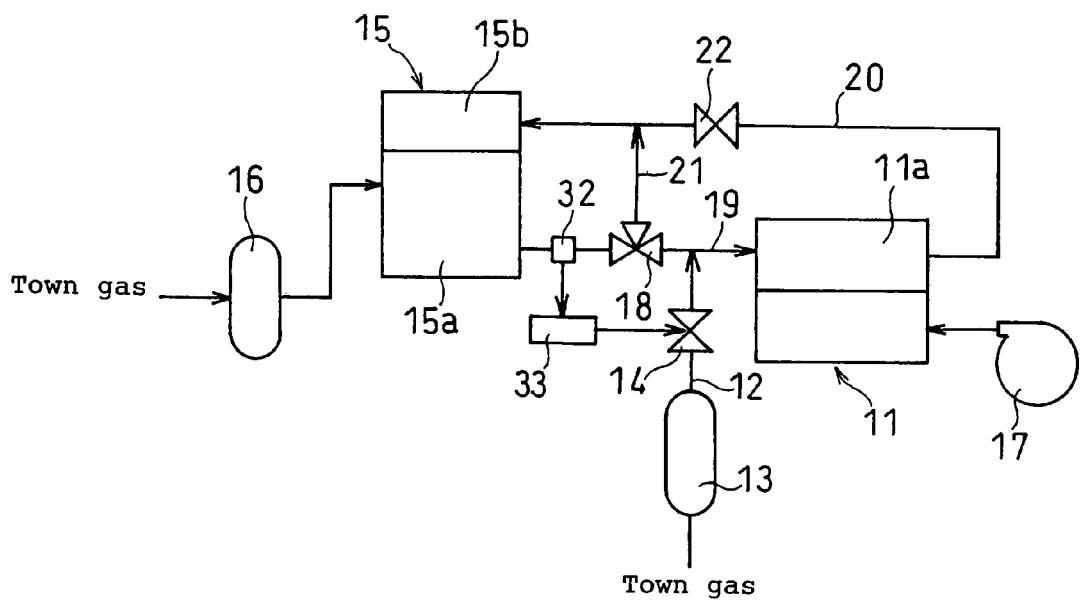
FIG. 2 is a diagram schematically showing a structure of a system of fuel cell power generation according to EMBODIMENT MODE 2 of the present invention.

FIG. 2 is a schematic diagram showing a fuel cell power generation system according to EMBODIMENT MODE 2 of the present invention. The fuel cell power generation system according to the present EMBODIMENT MODE includes a fuel cell 11 for generating an electric power by using a fuel gas and an oxidant gas, and desulfurizer 16 for removing sulfur content from a source gas, such as town gas representatively, which has, as a main ingredient, a compound of carbon and hydrogen such as a hydrocarbon and contains the sulfur content. According to the present EMBODIMENT MODE, a town gas is used for the source gas.

The fuel cell power generation system according to the present EMBODIMENT MODE further comprises: a fuel gas generator 15 comprising a reactor 15a for subjecting the desulfurized town gas to steam reforming thereby to generate a hydrogen-rich fuel gas, and a burner 15b as a heating means for performing reforming reaction; a fuel gas supply pipe 19 for supplying the fuel gas to the fuel cell 11; residual fuel gas pipe 20 for supplying a residual fuel gas to the burner 15b; a blower 17 for supplying an air, as an oxidant gas, to the fuel cell 11; and a desulfurized gas supply pipe 12 for supplying, to the fuel gas supply pipe 19, the desulfurized gas made of the town gas with the sulfur content thereof having been removed. Further, the desulfurized gas supply pipe 12 is provided with a desulfurizer 13 for removing sulfur content from a town gas and an open/close valve 14 for supplying/stopping the desulfurized gas.

The system further comprises a fuel cell bypass pipe 21 for enabling bypassing from the fuel gas supply pipe 19 to the residual fuel gas pipe 20, wherein by switching a flow channel switching valve 18, the fuel gas from the fuel gas generator 15 is either supplied to the fuel cell 11, or exhausted through the fuel cell bypass pipe 21. The residual fuel gas pipe 20 is further provided with an open/close value 22 upstream of the joining portion between the residual fuel gas pipe 20 and the fuel cell bypass pipe 21. Depending on needs, the system further comprises a carbon monoxide density detecting means 32 for detecting carbon monoxide density in the fuel gas generated by the fuel gas generator 15, and also comprises a controller 33 for controlling opening/closing of the open/close valve 14 in response to the detected value of carbon monoxide density.

Figure 3:
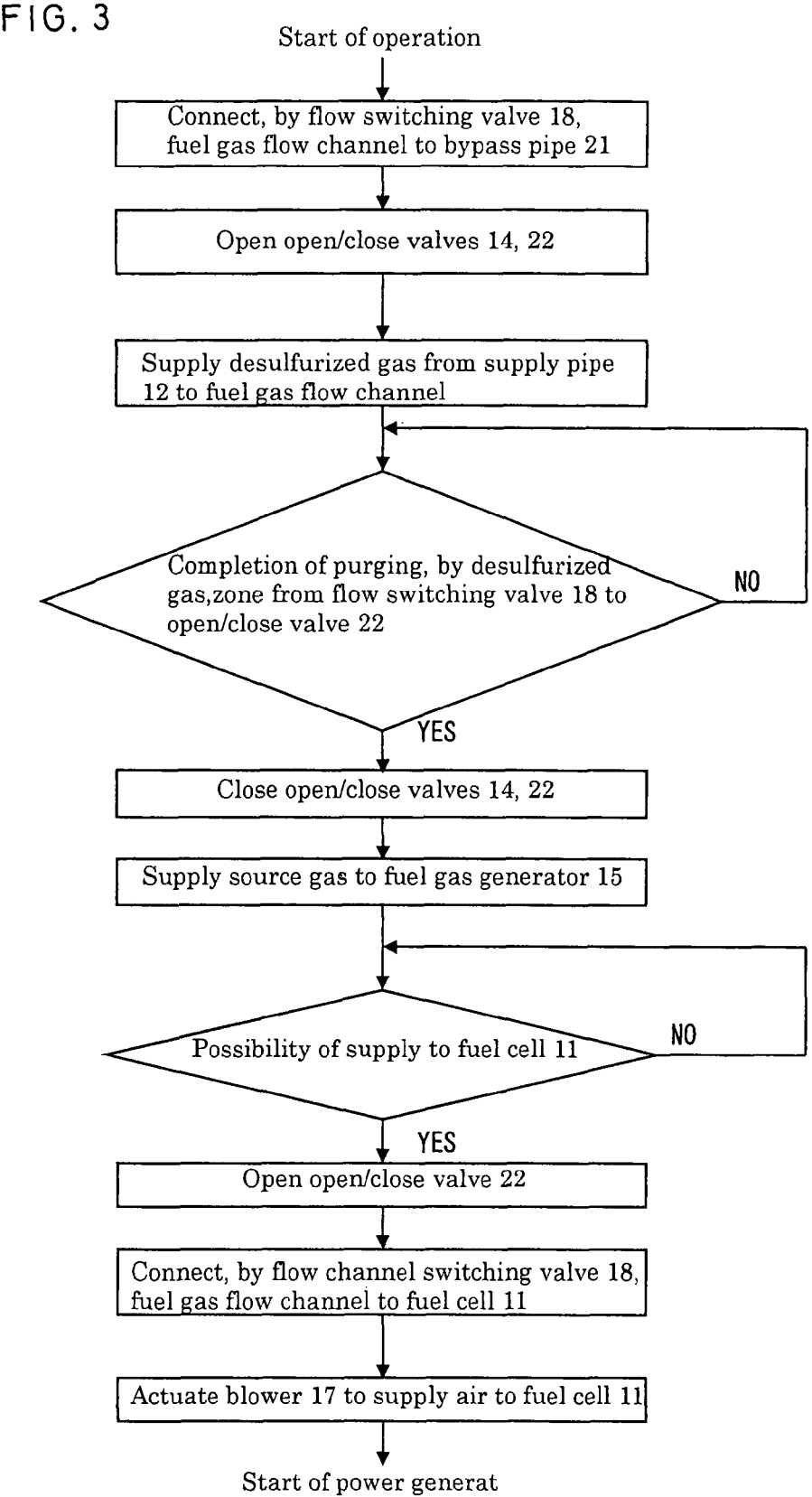
FIG. 3 is a flow chart showing an example of a process of starting the operation of the system of fuel cell power generation according to EMBODIMENT MODE 2 of the present invention.

With reference to the fuel cell power generation system as shown in FIG. 2 and a flow chart of a first example of a method of starting the operation of the system as shown in FIG. 3, including a specific purging process by using a desulfurized gas according to the present EMBODIMENT MODE, an example of operation of starting the fuel cell power generation system according to the present EMBODIMENT MODE is described as follows. Before start of power generation of the fuel cell power generation system, the flow channel switching valve 18 is switched to allow the fuel gas to flow through the fuel cell bypass pipe 21 first of all. Next, the open/close valves 14 and 22 are opened for injecting, from the desulfurized gas supply pipe 12 to the fuel gas supply pipe 19, the desulfurized gas of the town gas with its sulfur content having been removed by the desulfurizer 13, thereby to purge, by the desulfurized gas, the atmosphere of the fuel electrode 11a of the fuel cell 11 and the inside atmosphere of the fuel gas supply pipe 19 downstream of the flow channel switching valve 18 as well as the inside atmosphere of the residual fuel gas pipe 20 upstream of the open/close valve 22.

After this purging by the desulfurized gas is completed, the open/close valves 14 and 22 are closed. Then, the desulfurized gas, with its previously contained sulfur content having been removed by the desulfurizer 16, is supplied to the fuel gas generator 15, thereby to bring the ingredients of the fuel gas to a condition where to be able to generate an electric power. Thereafter, the open/close valve 22 is opened, and the flow channel switching valve 18 is switched to connect the fuel gas flow channel to the fuel cell, thereby to supply the fuel gas to the fuel electrode 11a of the fuel cell 11. At the same time, the blower 17 is actuated to supply an air to the oxidant electrode or air electrode of the fuel cell 11, thereby to perform the power generation.

The fuel gas supplied to the fuel electrode 11a of the fuel cell 11 is a hydrogen-rich gas, which may bring about a fear of explosion if it directly contacts air. However, according to the purging process of the present EMBODIMENT MODE, before the start of power generation, the atmosphere of the fuel gas flow channel in the zone from the flow channel switching valve 18 to the open/close valve 22 is purged by the desulfurized gas, and thereafter the fuel gas is supplied to the fuel electrode 11a of the fuel cell 11 for starting power generation.

Therefore, even if the residual gas at the fuel electrode 11a of the fuel cell 11 before the start of the operation of the system, namely before the purging process, contains air, there is no danger for the air to contact the fuel gas, so that there is no fear for the fuel gas to get exploded at the inside of the fuel cell 11. In other words, safe starting operation of the fuel cell power generation system can be realized, without any supply of nitrogen, according to the structure of the fuel cell power generation system as described in the present EMBODIMENT MODE and according to the specified purging process of purging the atmosphere of the fuel gas flow channel by the desulfurized gas according to the present EMBODIMENT MODE.

Figure 4:
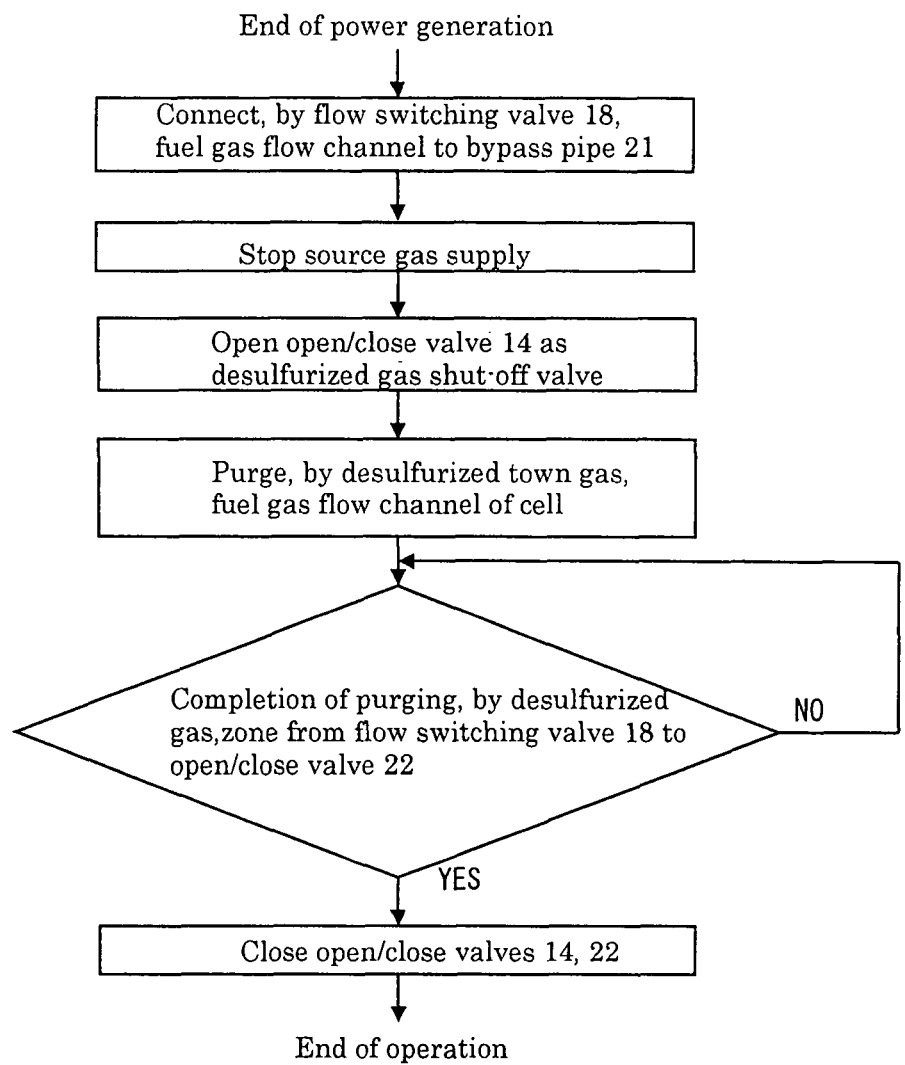
FIG. 4 is a flow chart showing an example of a process of stopping the operation of the system of fuel cell power generation according to EMBODIMENT MODE 2 of the present invention.

Next, with reference to the fuel cell power generation system as shown in FIG. 2 and a flow chart of an example of a method of ending the operation of the system as shown in FIG. 4, including a specific purging process by using a desulfurized gas according to the present EMBODIMENT MODE, an example of operation of ending the fuel cell power generation system according to the present EMBODIMENT MODE 2 is described as follows. For ending the operation of the fuel cell power generation system, the flow channel switching valve 18 is operated to connect the fuel gas flow channel to the fuel cell bypass pipe 21, thereby to stop the supply of the town gas as the source gas. Next, the open/close valve 14 is opened for injecting the desulfurized gas to the fuel gas supply pipe 19, thereby to purge the zone of the fuel gas flow channel from the flow channel switching valve 18 to the open/close valve 22.

After this purging process is completed, the open/close valves 14 and 22 are closed for ending the operation. The fuel gas supplied to the fuel electrode 11a of the fuel cell 11 is a hydrogen-rich gas, which may bring about a fear of explosion, if it directly contacts air. However, according to the purging process of the present EMBODIMENT MODE, after the end of power generation, the supply of the fuel gas to the fuel electrode 11a of the fuel cell 11 is stopped, and thereafter the atmosphere of the zone of the fuel gas flow channel from the flow channel switching valve 18 to the open/close valve 22 is purged by the desulfurized gas. Therefore, no or substantially no fuel gas is left, as a residual fuel gas, at the fuel electrode 11a or the fuel gas flow channel of the fuel cell 11.

Therefore, even if air flows into the inside of the fuel electrode 11a or the fuel gas flow channel of the fuel cell 11, there is no fear for the fuel gas to get exploded at the inside of the fuel cell 11, since the fuel cell 11 does not contain residual fuel gas. In other words, safe ending operation of the fuel cell power generation system can be realized, without any supply of nitrogen, according to the structure of the fuel cell power generation system as described in the present EMBODIMENT MODE and according to the specified purging process of purging the atmosphere of the fuel gas flow channel by the desulfurized gas according to the present EMBODIMENT MODE.

It is to be noted here that according to the above description, the open/close valve 22 is closed for completing the purging process, but can also be kept open for ending the operation.

Figure 5:
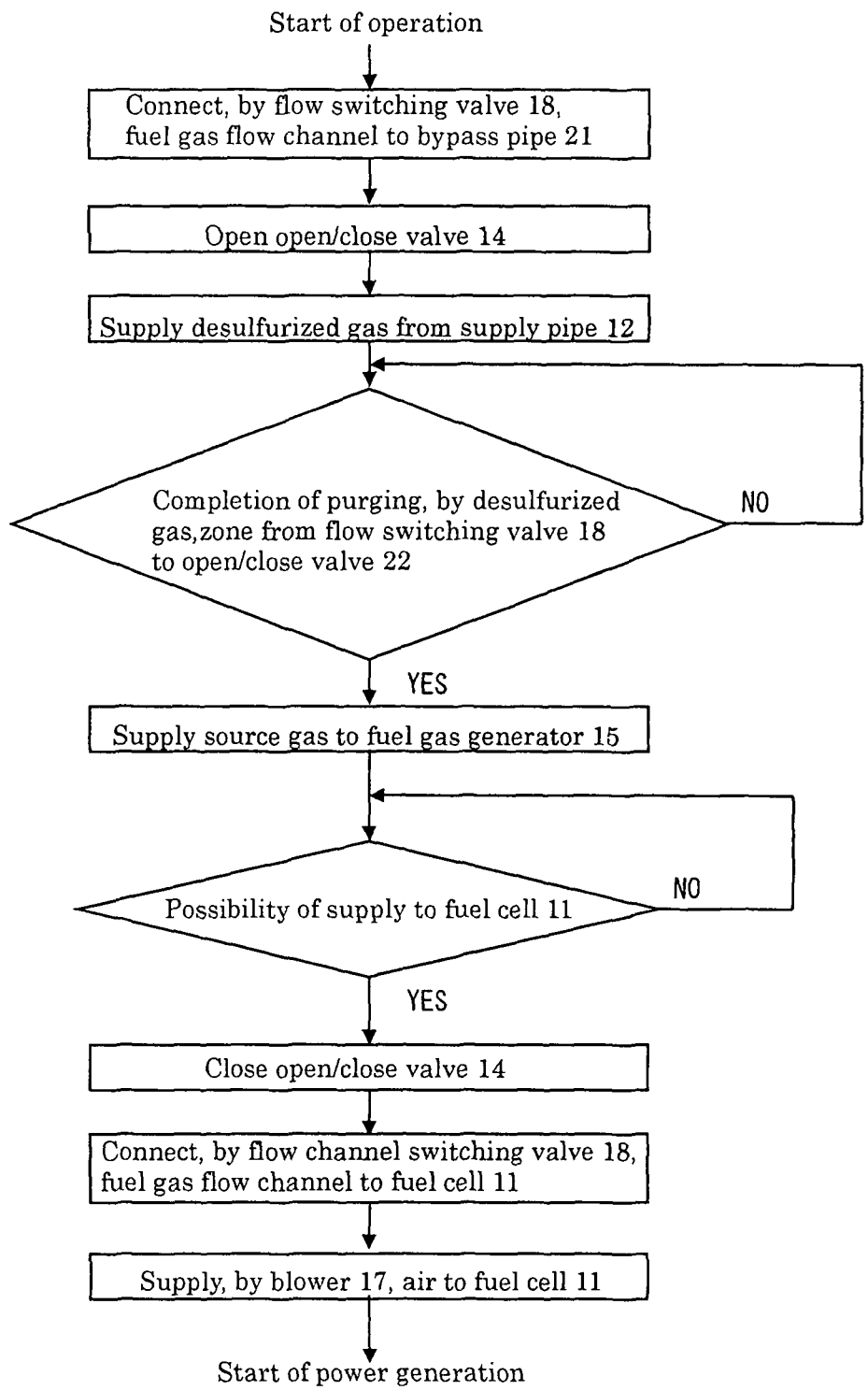
FIG. 5 is a flow chart showing another example of a process of starting the operation of the system of fuel cell power generation according to EMBODIMENT MODE 2 of the present invention.

Next, with reference to the fuel cell power generation system as shown in FIG. 2 and a flow chart of a second example a method of starting the operation of the system as shown in FIG. 5, including a specific purging process by using a desulfurized gas according to the present EMBODIMENT MODE, another example of operation of starting the system of fuel cell power generation according to the present EMBODIMENT MODE is described as follows. It is to be noted that the fuel cell power generation system does not need an open/close valve 22. However, in the following, description is made on the basis of a structure of the system with the open/close valve 22 being present and always kept open.

Before start of power generation of the fuel cell power generation system, the flow channel switching valve 18 is switched to allow the fuel gas to flow through the fuel cell bypass pipe 21 first of all. Next, the open/close valve 14 is opened for injecting, from the desulfurized gas supply pipe 12 to the fuel gas supply pipe 19, the desulfurized gas of the town gas with its sulfur content having been removed by the desulfurizer 13, thereby to purge, by the desulfurized gas, the atmosphere of the fuel electrode 11a of the fuel cell 11 and the inside atmosphere of the fuel gas supply pipe 19 downstream of the flow channel switching valve 18 as well as the inside atmosphere of the residual fuel gas pipe 20 upstream of the open/close valve 22.

After this purging by the desulfurized gas is completed, the desulfurized gas with its previously contained sulfur content having been removed by the desulfurizer 16 is supplied to the fuel gas generator 15, thereby to bring the ingredients of the fuel gas to a condition where to be able to generate an electric power. Thereafter, the open/close valve 14 is closed, thereby to stop the supply of the desulfurized gas. Subsequently, the flow channel switching valve 18 is switched for supplying the fuel gas to the fuel cell 11, and at the same time the blower 17 is actuated to supply an air to the fuel cell 11, thereby to perform the power generation.

According to the method of starting the operation of the system described above with reference to the flow chart of the second example, the following effect can be obtained in addition to the effect obtained by the method of starting the operation described with reference to the flow chart of the first example as shown in FIG. 3. Specifically describing, in the starting operation of the fuel cell power generation system, the fuel gas generated by the fuel gas generator 15 contains a highly dense carbon monoxide. So, if such fuel gas flows into the fuel electrode of the fuel cell, the fuel electrode gets poisoned. However, since the desulfurized gas is injected into the fuel gas pipe 19 in the starting operation thereof, it can be realized that the fuel gas containing such highly dense carbon monoxide is prevented from diffusingly flowing into the fuel electrode via the bypass pipe 21 and the open/close valve 22, which is kept open.

Thus, by the specified method of starting the operation of the fuel cell power operation system according to the present EMBODIMENT MODE, safe starting operation thereof can be realized without any supply of nitrogen, and also the fuel electrode 11a of the fuel cell 11 can be prevented from being poisoned with carbon monoxide in the starting operation thereof.

Depending on needs, the fuel cell power generation system further comprises a carbon monoxide density detecting means 32 for detecting carbon monoxide density in the fuel gas generated by the fuel gas generator 15, and also comprises a controller 33 for controlling opening/closing of the open/close valve 14 in response to the detected value of carbon monoxide density.

The controller 33 is so set that the open/close valve 14 is kept open for injecting the desulfurized gas into the fuel electrode 11a or fuel gas flow channel of the fuel cell until the value detected by the carbon monoxide detecting means 32 becomes lower than a predetermined value, and that the open/close valve 14 is closed after the detected value gets lower than the predetermined value. Thereby, carbon monoxide can be prevented from diffusingly flowing into the fuel cell 11, and the amount of used desulfurized gas can be appropriately controlled.

It is to be noted here that in the above description of operation, the open/close valve 22 is always kept open, but that similar consequential effects can be obtained even without using such open/close valve 22, which contributes to cost down of the system owing to the decrease of used components.

EMBODIMENT MODE 3

Figure 6:
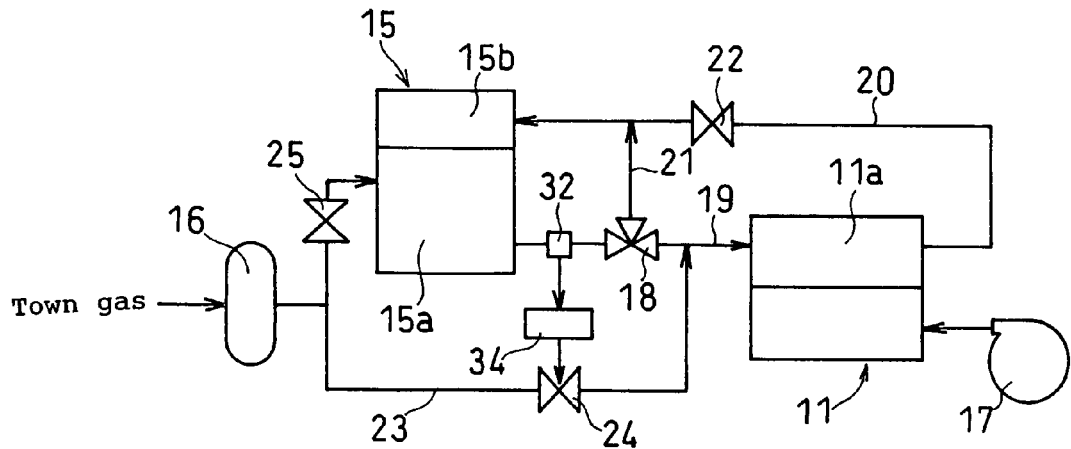
FIG. 6 is a diagram schematically showing a structure of a system of fuel cell power generation according to EMBODIMENT MODE 3 of the present invention.

FIG. 6 is a schematic diagram showing a system of fuel cell power generation according to EMBODIMENT MODE 3 of the present invention. Comparing FIG. 6 with FIG. 2, like elements in FIG. 6 similar to those in FIG. 2 designated by certain reference numerals in FIG. 2 are designated by correspondingly the same reference numerals in FIG. 6, and description thereof is omitted, where deemed unnecessary. In FIG. 6, reference numeral 23 designates a fuel gas generator-bypassing pipe for directly supplying the desulfurized gas to the fuel cell 11, bypassing the fuel gas generator 15, wherein the desulfurized gas is made of a source gas and made by removing sulfur content from the source gas, using the desulfurizer 16, wherein the source gas contains a compound of carbon and hydrogen like hydrocarbon as a main ingredient as well as the sulfur content, and a representative example of the source gas is a town gas. In the present EMBODIMENT MODE, a town gas is used for the source gas.

The fuel gas generator-bypassing pipe 23 is provided with an open/close valve 24. Further, the pipe for supplying the desulfurized gas, as the source gas, to the fuel gas generator 15 is provided with a source gas supply valve 25 for supplying/stopping the source gas. In addition, depending on needs, the fuel cell power generation system further comprises a carbon monoxide density detecting means 32 for detecting carbon monoxide density in the fuel gas generated by the fuel gas generator 15, and also comprises a controller 34 for controlling opening/closing of the open/close valve 24 in response to the detected value of carbon monoxide density detected by the carbon monoxide detecting means 32.

With reference to the fuel cell power generation system as shown in FIG. 6 and a flow chart of a first example of a method of starting the operation of the system as shown in FIG. 7, an example of operation of starting the fuel cell power generation system according to the present EMBODIMENT MODE 3 is described as follows. Before start of power generation of the fuel cell power generation system, the flow channel switching valve 18 is switched to allow the fuel gas to flow through the fuel cell bypass pipe 21 first of all. Next, the open/close valves 24 and 22 are opened, and the source gas supply valve 25 is closed for injecting, from the fuel gas generator-bypassing pipe 23 to the fuel gas supply pipe 19, the desulfurized gas of the source gas such as the town gas with its sulfur content having been removed by the desulfurizer 16, thereby to purge, by the desulfurized gas, the atmosphere of the fuel electrode 11a of the fuel cell 11 and the inside atmosphere of the fuel gas supply pipe 19 downstream of the flow channel switching valve 18 as well as the inside atmosphere of the residual fuel gas pipe 20 upstream of the open/close valve 22.

After this purging by the desulfurized gas is completed, the open/close valves 24 and 22 are closed, and thereafter the source gas supply valve 25 is opened for supplying the source gas to the fuel gas generator 15. After the ingredients of the fuel gas are brought to a condition where to be able to generate an electric power, the open/close valve 22 is opened, and the flow channel switching valve 18 is switched for supplying the fuel gas to the fuel cell 11. At the same time, the blower 17 is actuated to supply an air to the fuel cell 11, thereby to perform the power generation.

According to this described purging process by the desulfurized gas, before the start of power generation, the atmosphere of the fuel gas flow channel in the zone from the flow channel switching valve 18 to the open/close valve 22 is purged by the desulfurized gas, and thereafter the fuel gas is supplied to the fuel electrode 11a of the fuel cell 11 for starting power generation. Therefore, even if air is contained in the residual gas at the fuel electrode 11a of the fuel cell 11 or fuel gas flow channel at which the fuel electrode is placed before the start of the operation of the system, namely before the purging process, there is no danger for the air to contact the fuel gas, so that there is no fear for the fuel gas to get exploded at the inside of the fuel cell 11.

Furthermore, since the desulfurized gas used for purging the atmosphere to be purged is made from the same source as that from which the source gas is made, a simpler and more effective system arrangement can be realized. In other words, safe starting operation of the fuel cell power generation system can be realized with a more effective system arrangement, without any supply of nitrogen, according to the structure of the fuel cell power generation system as described in the present EMBODIMENT MODE and according to the specified purging process of the present EMBODIMENT MODE.

Figure 8:
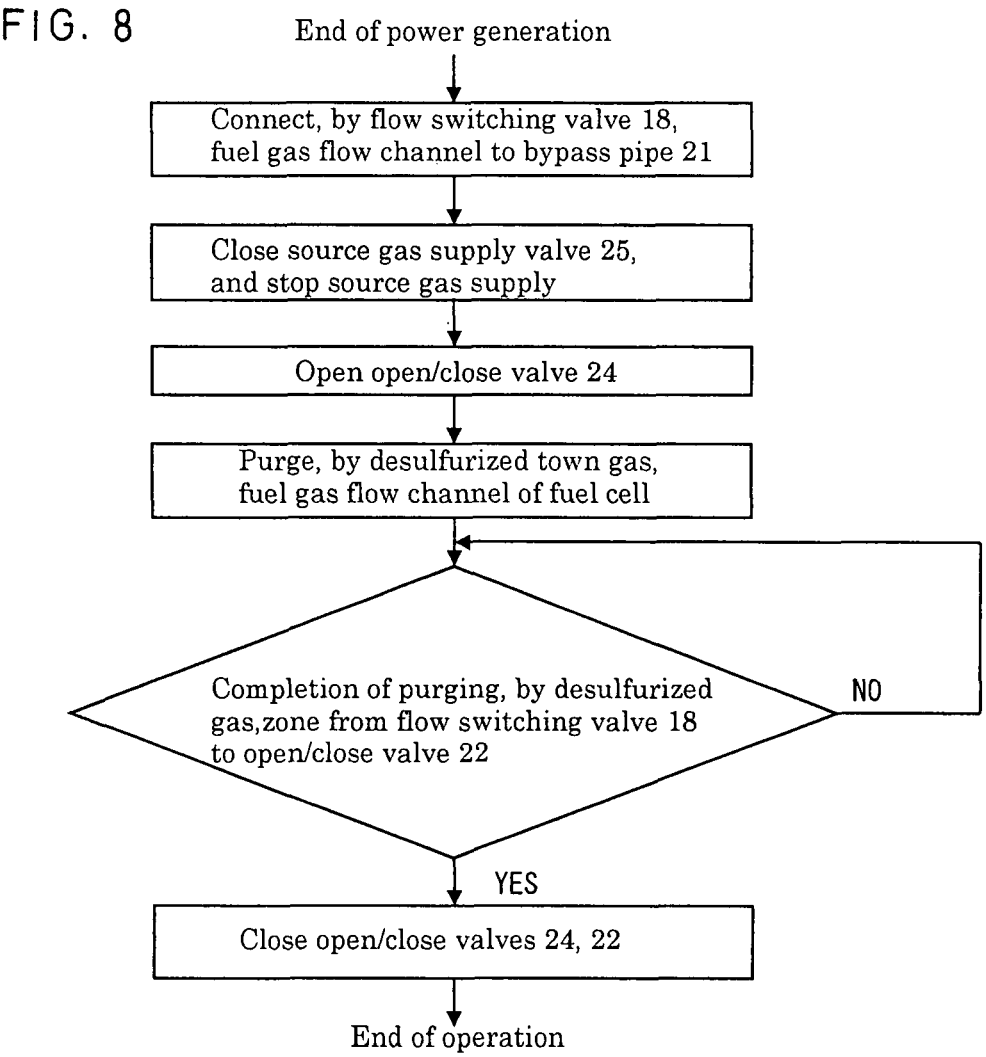
FIG. 8 is a flow chart showing an example of a process of stopping the operation of the system of fuel cell power generation according to EMBODIMENT MODE 3 of the present invention.

Next, with reference to the fuel cell power generation system as shown in FIG. 6 and a flow chart of a first specific example of a method of ending the operation of the system as shown in FIG. 8, an example of operation of ending the fuel cell power generation system according to the present EMBODIMENT MODE 3 is described as follows. For ending the operation of the fuel cell power generation system, the flow channel switching valve 18 is operated to connect the fuel gas flow channel to the fuel cell bypass pipe 21, and the source gas supply valve 25 is closed, thereby to stop the supply of the source gas. Next, the open/close valve 24 is opened for injecting, from the fuel gas generator-bypassing pipe 23 to the fuel gas supply pipe 19, the desulfurized gas with its previously contained sulfur content having been removed by the desulfurizer 16, thereby to purge the zone of the fuel gas flow channel from the flow channel switching valve 18 to the open/close valve 22.

After this purging process is completed, the open/close valves 24 and 22 are closed for ending the operation. The fuel gas supplied to the fuel electrode 11a of the fuel cell 11 is a hydrogen-rich gas, which may bring about a fear of explosion, if it directly contacts air. However, according to the purging process of the present EMBODIMENT MODE as described above, after the end of power generation, the supply of the fuel gas to the fuel electrode 11a of the fuel cell 11 is stopped, and thereafter the atmosphere of the zone of the fuel gas flow channel from the flow channel switching valve 18 to the open/close valve 22 is purged by the desulfurized gas. Therefore, no or substantially no fuel gas is left, as a residual fuel gas, at the fuel electrode 11a or the fuel gas flow channel of the fuel cell 11.

Therefore, even if air flows into the inside of the fuel electrode 11a or the fuel gas flow channel of the fuel cell 11, there is no fear for the fuel gas to get exploded at the inside of the fuel cell 11, since the fuel cell 11 does not contain residual fuel gas. In other words, safe ending operation of the fuel cell power generation system can be realized, without any supply of nitrogen, according to the structure of the fuel cell power generation system and to the specific purging process as described in the present EMBODIMENT MODE.

It is to be noted here that according to the above description, the open/close valve 22 is closed for completing the purging process, but can also be kept open for ending the operation.

Figure 9:
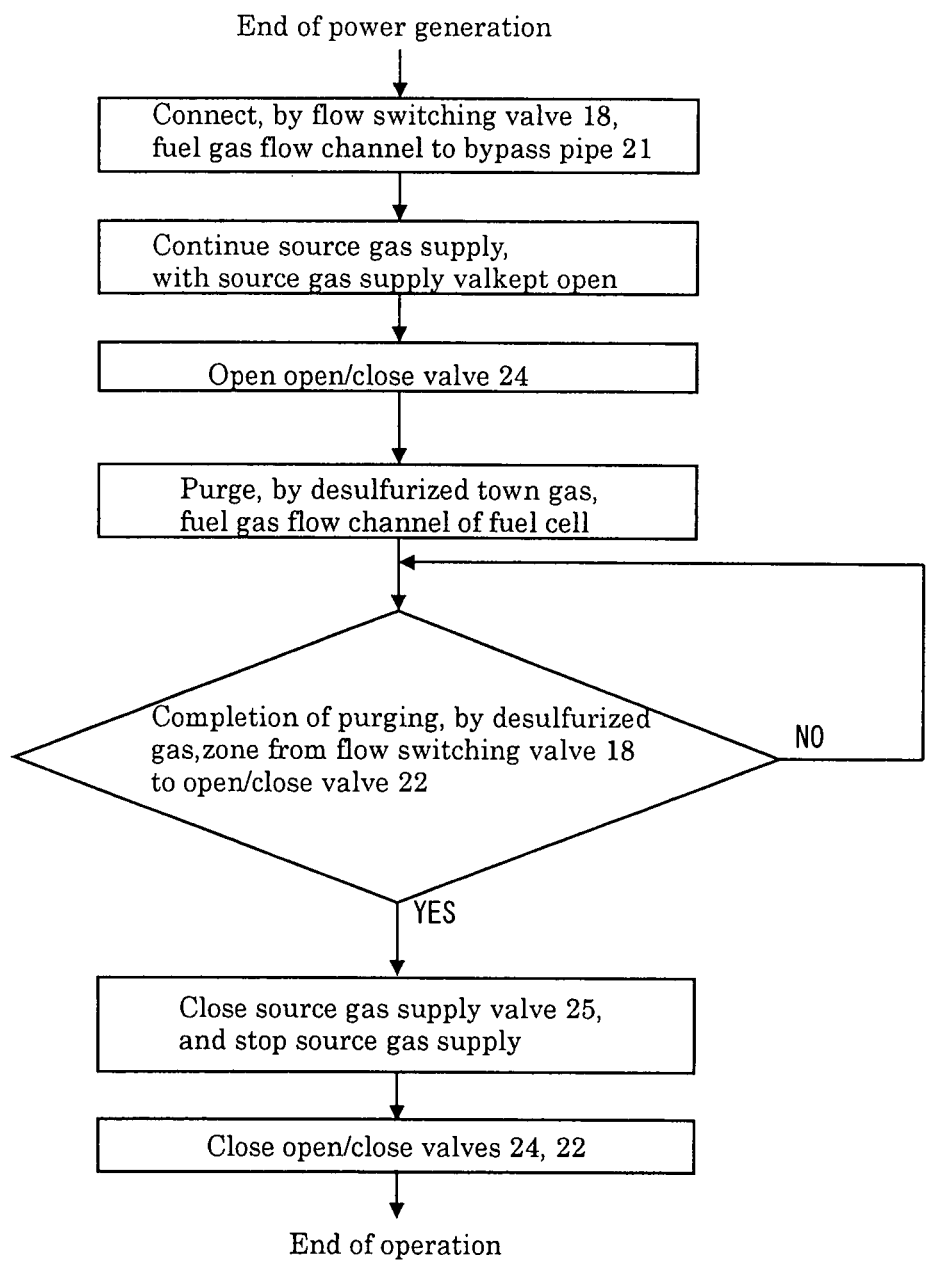
FIG. 9 is a flow chart showing another example of a process of stopping the operation of the system of fuel cell power generation according to EMBODIMENT MODE 3 of the present invention.

Next, with reference to the fuel cell power generation system as shown in FIG. 6 and a flow chart of a second specific example of a method of ending the operation of the system as shown in FIG. 9, another example of operation of ending the fuel cell power generation system according to the present EMBODIMENT MODE 3 is described as follows.

For ending the operation of the fuel cell power generation system, the flow channel switching valve 18 is operated to connect the fuel gas flow channel to the fuel cell bypass pipe 21, and the supply of the source gas is continued to generate the fuel gas, with the source gas supply valve 25 being kept open. Thereafter, the open/close valve 24 is opened for injecting, from the fuel gas generator-bypassing pipe 23 to the fuel gas supply pipe 19, the desulfurized gas with its previously contained sulfur content having been removed by the desulfurizer 16, thereby to purge the atmosphere of the zone of the fuel gas flow channel from the flow channel switching valve 18 to the open/close valve 22.

After this purging process is completed, the open/close valves 24 and 22 are closed for ending the operation. The fuel gas supplied to the fuel electrode 11a of the fuel cell 11 is a hydrogen-rich gas, which may bring about a fear of explosion, if it directly contacts air. However, according to the purging process of the present EMBODIMENT MODE as described above, after the end of power generation, the supply of the fuel gas to the fuel electrode 11a of the fuel cell 11 is stopped, and thereafter the atmosphere of the zone of the fuel gas flow channel from the flow channel switching valve 18 to the open/close valve 22 is purged by the desulfurized gas. Therefore, no or substantially no fuel gas is left, as a residual fuel gas, at the fuel electrode 11a or the fuel gas flow channel of the fuel cell 11.

Therefore, even if air flows into the inside of the fuel electrode 11a or the fuel gas flow channel of the fuel cell 11, there is no fear for the fuel gas to get exploded at the inside of the fuel cell 11, since the fuel cell 11 does not contain residual fuel gas. Furthermore, both the desulfurized gas and the source gas return to the burner 15b, so that the burner 15b does not catch an accidental fire, and stable burning can be realized.

In other words, safe ending operation of the fuel cell power generation system can be realized, without any supply of nitrogen, and stable burning of the burner can be realized at the ending operation thereof according to the structure of the fuel cell power generation system and to the specific purging process as described in the present EMBODIMENT MODE.

It is to be noted here that according to the above description, the open/close valve 22 is closed for completing the purging process, but can also be kept open for ending the operation.

Next, with reference to the fuel cell power generation system as shown in FIG. 6 and a flow chart of a second example a method of starting the operation of the system as shown in FIG. 10 according to the present EMBODIMENT MODE 3, another example of operation of starting the system of fuel cell power generation according to the present EMBODIMENT MODE is described as follows. It is to be noted here that the fuel cell power generation system does not need to have an open/close valve 22. However, in the following, description of operation is made on the basis of a structure of the system with the open/close valve 22 being always kept open.

Before start of power generation of the fuel cell power generation system, the flow channel switching valve 18 is switched to allow the fuel gas to flow through the fuel cell bypass pipe 21 first of all. Next, the open/close valve 24 is opened and the source gas supply valve 25 is closed in order to inject, from the fuel gas generator-bypassing pipe 23 to the fuel gas supply pipe 19, the desulfurized gas of the town gas with its sulfur content having been removed by the desulfurizer 16, thereby to purge, by the desulfurized gas, the inside atmosphere of the fuel cell 11 and the inside atmosphere of the fuel gas supply pipe 19 downstream of the flow channel switching valve 18 as well as the inside atmosphere of the residual fuel gas pipe 20 upstream of the open/close valve 22.

After this purging by the desulfurized gas is completed, the source gas supply valve 25 is opened, and the desulfurized gas made from a source gas of e.g. a town gas by removing its sulfur content, using the desulfurizer 16, is supplied to the fuel gas generator 15. In the present EMBODIMENT MODE, the town gas is used as the source gas. After the ingredients of the fuel gas are brought to a condition where to be able to generate an electric power by the fuel cell 11, the open/close valve 24 is closed, thereby to stop the supply of the desulfurized gas to the fuel gas supply pipe 19. Meanwhile, the flow channel switching valve 18 is switched for supplying the fuel gas from the fuel gas generator 15 to the fuel cell 11, and at the same time the blower 17 is actuated to supply an air to the fuel cell 11, thereby to perform the power generation.

According to the method of starting the operation of the system described above with reference to the flow chart of the second example, the following effect can be obtained in addition to the effect obtained by the method of starting the operation described with reference to the flow chart of the first example as shown in FIG. 7. Specifically describing, in the starting operation of the fuel cell power generation system, the fuel gas generated by the fuel gas generator 15 contains a highly dense carbon monoxide. So, if such fuel gas flows into the fuel electrode 11a of the fuel cell 11, the fuel electrode gets poisoned. However, by injecting the desulfurized gas is into the fuel gas pipe 19 according to the specific operation of the present EMBODIMENT MODE, it can be realized that the fuel gas containing such highly dense carbon monoxide is prevented from diffusingly flowing into the fuel electrode 11a of the fuel cell 11.

Thus, by the specified method of starting the operation of the fuel cell power operation system according to the present EMBODIMENT MODE, safe starting operation thereof can be realized without any supply of nitrogen, and also the fuel electrode 11a of the fuel cell 11 can be prevented from being poisoned with carbon monoxide in the starting operation thereof.

Depending on needs, the fuel cell power generation system further comprises a carbon monoxide density detecting means 32 for detecting carbon monoxide density in the fuel gas generated by the fuel gas generator 15, and also comprises a controller 34 for controlling opening/closing of the open/close valve 24 in response to the detected value of carbon monoxide density detected by the carbon monoxide density detecting means 32.

The controller 34 is so set that the open/close valve 24 is kept open for injecting the desulfurized gas into the fuel electrode 11a or fuel gas flow channel of the fuel cell until the value detected by the carbon monoxide detecting means 32 becomes lower than a predetermined value, and that the open/close valve 24 is closed after the detected value gets lower than the predetermined value. Thereby, carbon monoxide can be prevented from diffusingly flowing into the fuel cell 11, and the amount of used desulfurized gas can be appropriately controlled.

It is to be noted here that in the above description of operation, the open/close valve 22 is always kept open, but similar consequential effects can be obtained even without using such open/close valve 22, which contributes to cost down of the system owing to the decrease of used components.

EMBODIMENT MODE 4

Figure 11:
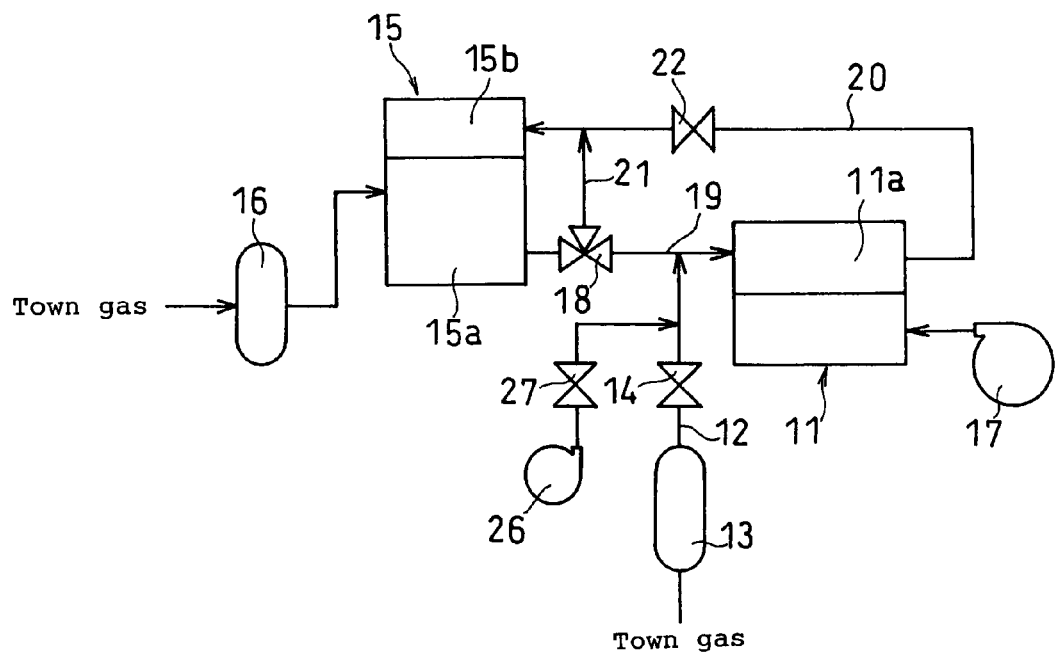
FIG. 11 is a diagram schematically showing a structure of a system of fuel cell power generation according to EMBODIMENT MODE 4 of the present invention.

FIG. 11 is a schematic diagram showing a system of fuel cell power generation according to EMBODIMENT MODE 4 of the present invention. Comparing FIG. 11 with FIG. 2 in EMBODIMENT MODE 2, like elements in FIG. 11 similar to those in FIG. 2 designated by certain reference numerals in FIG. 2 are designated by correspondingly the same reference numerals in FIG. 11, and description thereof is omitted, where deemed unnecessary. In the present EMBODIMENT MODE, the system further comprises a blower 26 for supplying an air to the desulfurized gas supply pipe 12 downstream of the open/close valve 14, and an open/close valve 27 for passing/shutting-off the air supply channel.

Figure 12:
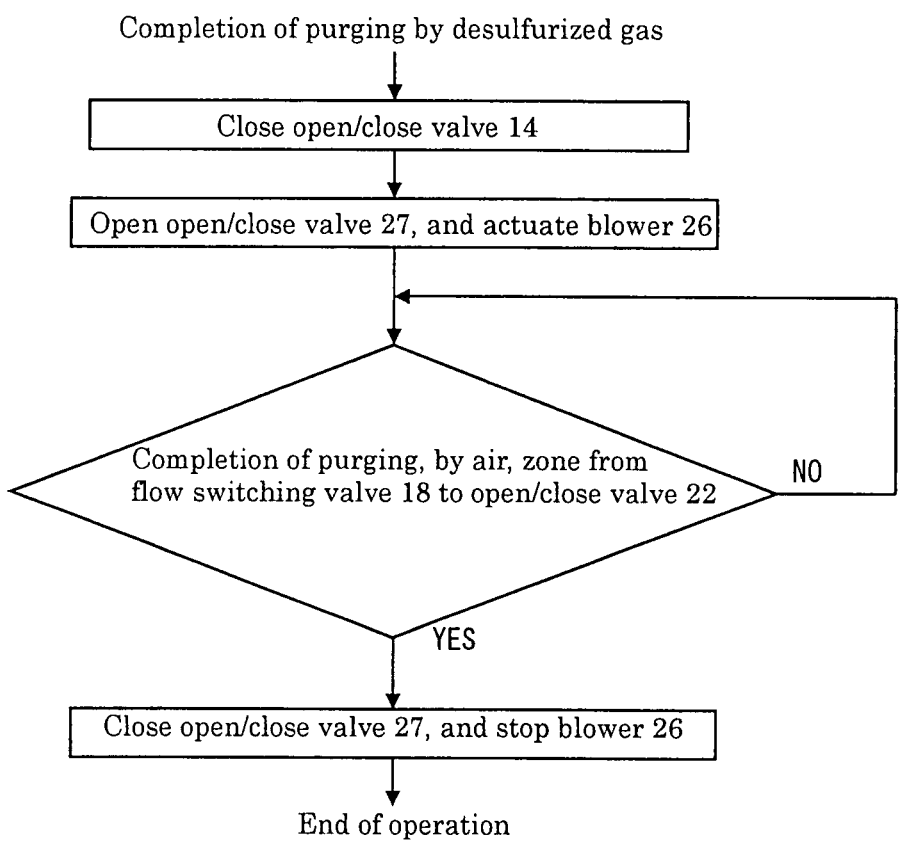
FIG. 12 is a flow chart showing an example of a process of stopping the operation of the system of fuel cell power generation according to EMBODIMENT MODE 4 of the present invention.

With reference to the fuel cell power generation system as shown in FIG. 11 and to the flow chart of a specified method of stopping the operation of the system as shown in FIG. 12, the operation of stopping the fuel cell power generation system according to the present EMBODIMENT MODE is described. It is to be noted here that the operation according to the present EMBODIMENT MODE is such one as to be performed after the operation of the system in accordance with the method of stopping the operation on the basis of the flow chart as shown in FIG. 4 in EMBODIMENT MODE 2. Therefore, operation described below is such one as after the process of purging, by the desulfurized gas, the atmosphere of the fuel gas flow channel of the fuel cell 11 at which the fuel electrode 11a is placed.

After the purging process by the desulfurized gas is completed, the open/close valve 14 is closed, and the open/close valve 27 is opened, and further the blower 26 is actuated for injecting an air to the desulfurized gas supply pipe 12 and then to the fuel gas supply pipe 19. Thereby, the atmosphere of the fuel gas flow channel from the flow channel switching valve 18 to the open/close valve 22 is purged by the air. After the purging by the air is completed, the blower 26 is stopped, and the operation of the system is ended.

According to the purging process of the present EMBODIMENT MODE, the atmosphere of the fuel gas flow channel in the zone thereof from the flow channel switching valve 18 to the open/close valve 22 is purged firstly by the desulfurized gas, and the atmosphere of the same zone is then purged by the air. Therefore, at the time of ending the operation thereof, the fuel cell 11 can be kept at a very safe condition. Further, since the fuel gas does not contact air, there is no danger of explosion in the inside of the fuel cell. In other words, according to the structure of the fuel cell power generation system and to the specific purging process of the present EMBODIMENT MODE, safe stopping of the operation of the system can be realized without any supply of nitrogen, and it can be realized furthermore to keep the fuel cell 11 at a safe condition at the time of ending the operation of the system.

EMBODIMENT MODE 5

Figure 13:
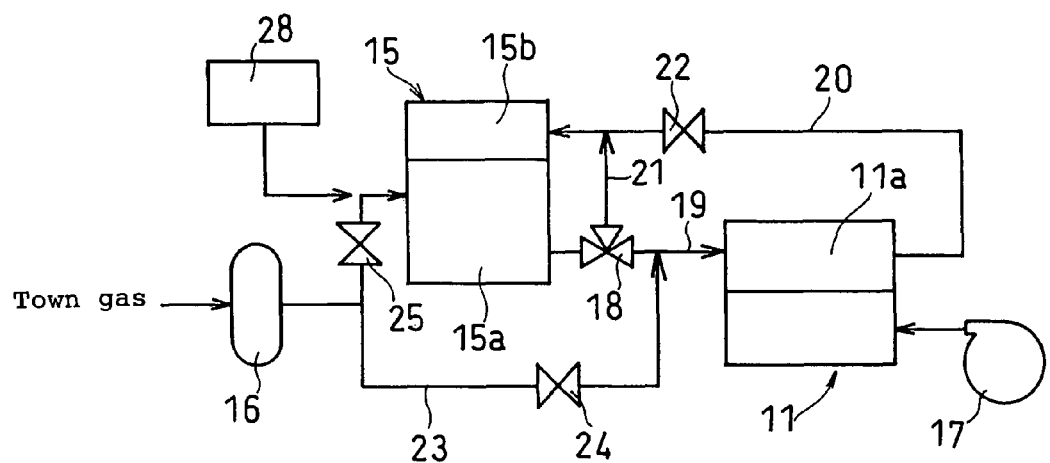
FIG. 13 is a diagram schematically showing a structure of a system of fuel cell power generation according to EMBODIMENT MODE 5 of the present invention.

FIG. 13 is a schematic diagram showing a system of fuel cell power generation according to EMBODIMENT MODE 5 of the present invention. Comparing this FIG. 13 with FIG. 6 in EMBODIMENT MODE 3, like elements in FIG. 13 similar to those in FIG. 6 designated by certain reference numerals in FIG. 6 are designated by correspondingly the same reference numerals in FIG. 13, and description thereof is omitted, where deemed unnecessary. In the present EMBODIMENT MODE, the system further comprises a steam generator 28 which is a means for purging the inside atmosphere of the fuel gas generator 15 by a steam.

Figure 14:
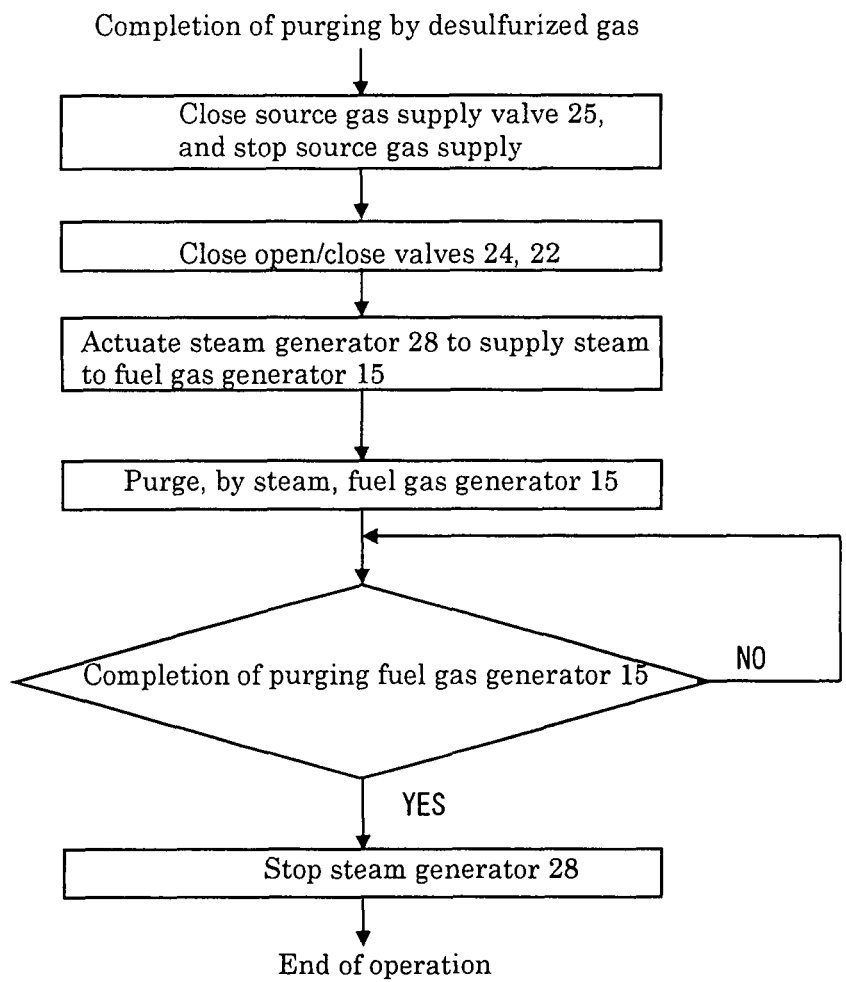
FIG. 14 is a flow chart showing an example of a process of stopping the operation of the system of fuel cell power generation according to EMBODIMENT MODE 5 of the present invention.

With reference to the fuel cell power generation system as shown in FIG. 13 and to the flow chart of an example of a specified method of stopping the operation of the system as shown in FIG. 14, an example of the operation of stopping the fuel cell power generation system according to the present EMBODIMENT MODE is described. It is to be noted here that the operation according to the present EMBODIMENT MODE is such one as to be performed after the operation of the system in accordance with the method of stopping the operation on the basis of the flow chart as shown in FIG. 9 in EMBODIMENT MODE 3. Therefore, operation described below is such one as after the process of purging, by the desulfurized gas, the atmosphere of the fuel gas flow channel of the fuel cell 11 at which the fuel electrode 11a is placed.

After the purging process of the fuel gas flow channel by the desulfurized gas is completed, the fuel gas supply valve 25 is closed, and then the open/close valves 24 and 22 are closed. Thereafter, a steam is supplied to the fuel gas generator 15 from the steam generator 28, thereby to purge the inside atmosphere of the fuel gas generator. After such purging process by the steam is completed, the steam generator 28 is stopped, and the operation of the system is ended. According to the purging process of the present EMBODIMENT MODE, the following effect can be obtained in addition to the effect obtained by the method of the operation as described above with reference to the flow chart as shown in FIG. 9 in EMBODIMENT MODE 3.

Firstly, the inside atmosphere of the fuel gas generator 15 is purged by the steam, whereby the fuel gas flow channel retains no or substantially no residual flammable gas. Furthermore, the injection of the steam into the fuel gas generator 15 promotes cooling of the fuel gas generator 15, whereby the operation of the system can be ended in a shorter time. In other words, according to the structure of the fuel cell power generation system and to the specific example of the purging process according to the present EMBODIMENT MODE, safe stopping of the operation of the system can be realized without any supply of nitrogen, and stable burning of the burner for ending the operation, with the flammable gas in the fuel gas flow channel being able to be removed. Furthermore, a time period necessary for ending the operation of the system can be shortened. Besides, although the open/close valve 22 is closed in the purging process as described above, the operation can also be ended with the open/close valve 22 being kept open.

Next, with reference to the fuel cell power generation system as shown in FIG. 13 and to a flow chart of a second specific example of the method of stopping the operation of the system according to the present EMBODIMENT MODE, a further example of stopping the operation of the system is described as follows. For ending the power generation of the fuel cell power generation system, the fuel gas flow channel is connected to the fuel cell bypass pipe 21 by the flow channel switching valve 18, and the source gas supply valve 25 is closed to stop the supply of the source gas. Subsequently, a steam is supplied to the fuel gas generator 15 from the steam generator 28, thereby to purge the inside atmosphere of the fuel gas generator.

On the other hand, with respect to the gas flow channel involving the fuel cell 11, the open/close valve 24 is opened for ending the power generation, and the desulfurized gas having been subjected to the desulfurizing treatment by the desulfurizer 16 is injected into the fuel gas generator-bypassing pipe 23, and then to the fuel gas supply pipe 19, thereby to purge the atmosphere of the zone of the gas flow channel from the flow channel switching valve 18 to the open/close valve 22. After the purging, by the steam, of the flow channel spanning from the fuel gas generator 15 to the fuel cell bypass pipe 21 is completed, the steam generator 28 is stopped, and the purging by the steam is ended. Likewise, after the purging, by the desulfurized gas, of the atmosphere of the gas flow channel from the flow channel switching valve 18 to the open/close valve 22 is completed, the source gas supply valve 25 is closed, thereby to stop the supply of the town gas, which is the source gas, and then the open/close valves 24 and 22 are closed, whereby the purging by the desulfurized gas is ended.

According to the purging process as described above in the present EMBODIMENT MODE, the following effect can be obtained in addition to the effect as described above in EMBODIMENT MODE 3. Firstly, since the inside atmosphere of the fuel gas generator 15 is purged by a steam, the fuel gas flow channel thereafter retains no or substantially no residual flammable gas. Further, since the steam is injected into the fuel gas generator 15, cooling of the fuel gas generator 15 is promoted thereby, so that a time period necessary to end the operation of the system can be shortened. Moreover, since the inside atmospheres of the two reactors, i.e. fuel gas generator 15 and fuel cell 11, can be simultaneously and independently purged, a further shortening of the time for ending the operation of the system can be realized.

In other words, according to the structure of the fuel cell power generation system and to the specific purging process as described in the present EMBODIMENT MODE, safe stopping of the operation of the system can be realized without any supply of nitrogen, and also removal of the flammable gas from the fuel gas flow channel can be realized. Furthermore, owing to the simultaneous and independent purging of the inside atmospheres of the two reactors, the time needed to end the operation of the system can be shortened. Besides, although the open/close valve 22 is closed in the above description for completing the purging process by the desulfurized gas, the open/close valve 22 can also be kept open during the ending operation of the system.

EMBODIMENT MODE 6

Figure 16:
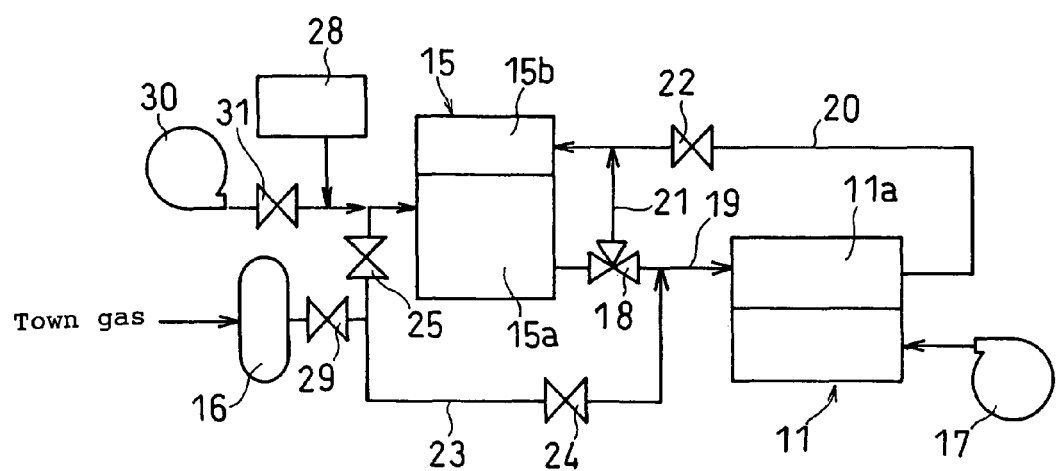
FIG. 16 is a diagram schematically showing a structure of a system of fuel cell power generation according to EMBODIMENT MODE 6 of the present invention.

FIG. 16 is a schematic diagram showing a system of fuel cell power generation according to EMBODIMENT MODE 6 of the present invention. Comparing this FIG. 16 with FIG. 13 in EMBODIMENT MODE 5, like elements in FIG. 16 similar to those in FIG. 13 designated by certain reference numerals in FIG. 13 are designated by correspondingly the same reference numerals in FIG. 16, and description thereof is omitted, where deemed unnecessary. In the present EMBODIMENT MODE, the system further comprises a desulfurized gas supply valve 29 for supplying/stopping a desulfurized gas, and a flower 30 for supplying an air to an upstream point of the fuel gas generator 15 as well as an open/close valve 31 for passing/shutting-off the air supply channel.

Figure 15:
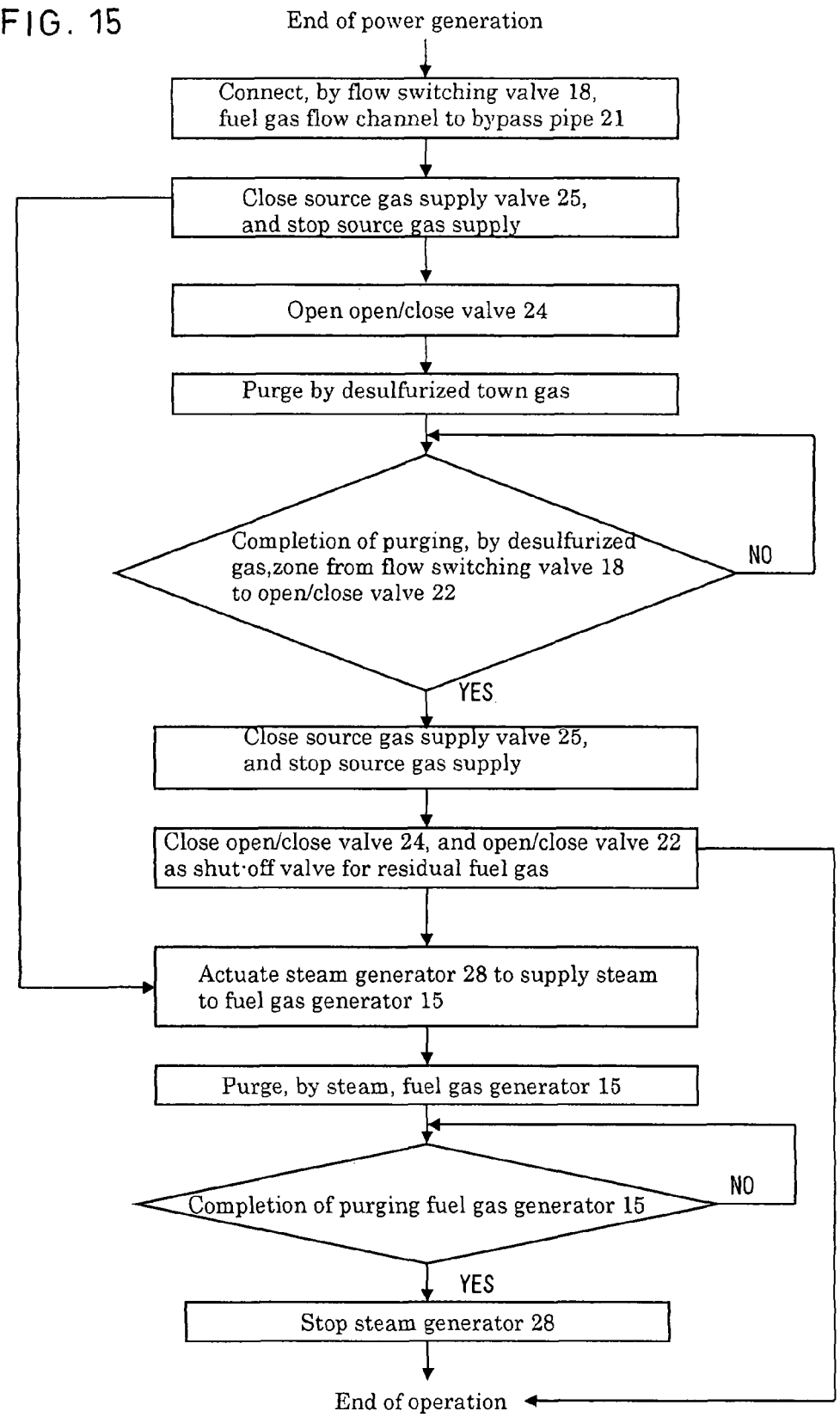
FIG. 15 is a flow chart showing another example of a process of stopping the operation of the system of fuel cell power generation according to EMBODIMENT MODE 5 of the present invention.

With reference to the fuel cell power generation system as shown in FIG. 16, an example of the operation of the fuel cell power generation system according to the present EMBODIMENT MODE is described. It is to be noted here that the feature of the operation according to the present EMBODIMENT MODE is in such operation as to be performed after the purging process by the desulfurized gas or the steam as described above on the basis of the flow chart as shown in FIG. 14 or FIG. 15 in EMBODIMENT MODE 5. Therefore, operation described below is such one as after the process of purging, by the steam, the inside atmosphere of the fuel gas generator 15, and the process of purging, by the desulfurized gas, the atmosphere of the fuel gas flow channel of the fuel cell 11 at which the fuel electrode 11a is placed.

After the purging process by the steam is ended, the desulfurized gas supply valve 29 is closed. Thereafter, the blower 30 is actuated and the open/close valve 31 is opened for supplying an air to the fuel gas generator 15, thereby to exhaust residual steam in the inside of the fuel gas generator 15 to the fuel gas supply pipe 19. Likewise, an air is also supplied to the fuel electrode 11a of the fuel cell 11 by the blower 30. Thereby, the atmosphere of the fuel gas flow channel downstream of the desulfurized gas supply valve 29 can be safely purged by the air. At the same time, the fuel cell 11 can be kept at a safe condition at the stopping operation of the system. Further, since the purging is performed by the air, it becomes possible to allow the atmosphere of the fuel gas flow channel down stream of the source gas or desulfurized gas supply valve 29 to be released to an outside atmosphere, whereby even if the fuel gas generator brings about its pressure drop due e.g. its temperature drop, it can be mitigated by an air taken in from the outside atmosphere.

Figure 17:
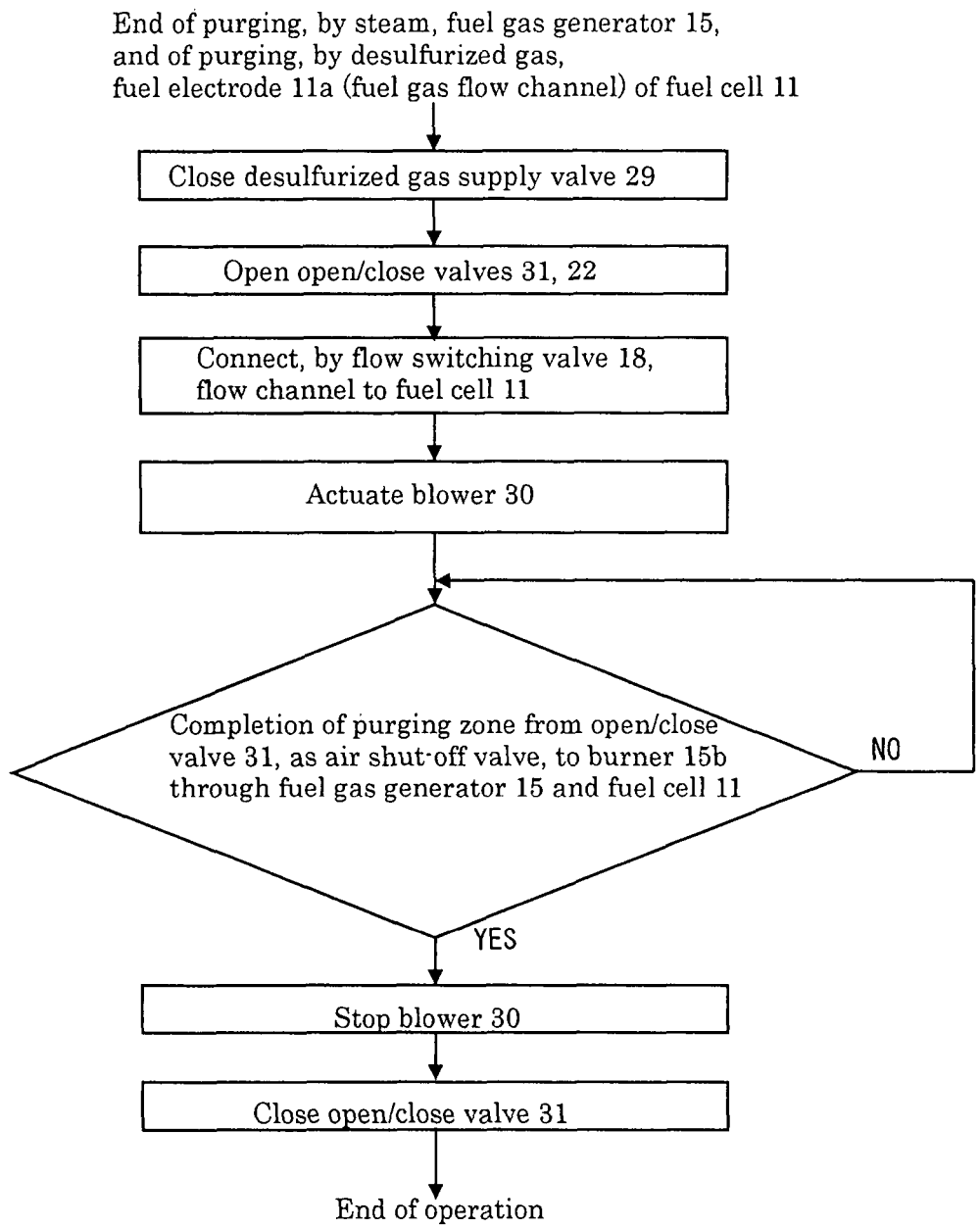
FIG. 17 is a flow chart showing an example of a process of stopping the operation of the system of fuel cell power generation according to EMBODIMENT MODE 6 of the present invention.

In the following, a more effective purging process by air is described, using an example of operation of stopping the fuel cell power generation system according to the present EMBODIMENT MODE with reference to the fuel cell power generation system as shown in FIG. 16 and to a flow chart of a first specific example of the stopping operation as shown in FIG. 17. The desulfurized gas supply valve 29 is closed, after the ending of the purging, by the steam, of the inside atmosphere of the fuel gas generator 15 as well as the purging, by the desulfurized gas, of the atmosphere of the fuel gas flow channel of the fuel cell 11, at which the fuel electrode 11a is placed.

Thereafter, the open/close valves 31 and 22 are opened, and the flow channel switching valve 18 is operated to connect the gas flow channel to the fuel cell 11. Subsequently, the blower 30 is actuated for flowing the air into the fuel gas generator 15, and then into the burner 15b via the fuel electrode 11a of the fuel cell 11, thereby to purge the atmosphere of the whole of the fuel gas flow channel.

After this purging process is ended, the blower 30 is stopped, and the open/close valve 31 is closed, thereby to end the operation of the system. According to the purging process, the air to purge the atmosphere to be purged is supplied at a point upstream of the fuel gas generator 15, and is not furcated. Therefore, the atmosphere of the fuel gas flow channel can be purged by the air continuously along the gas flow channel from the point upstream thereof to downstream thereof. In other words, the combination of the structure of the fuel cell power generation system with the specific purging process according to the present EMBODIMENT MODE 6 has an effect of being able to realize purging of the fuel gas flow channel continuously therealong from upstream to downstream thereof in addition to the effect already described at the outset of the present EMBODIMENT MODE 6.

Figure 18:
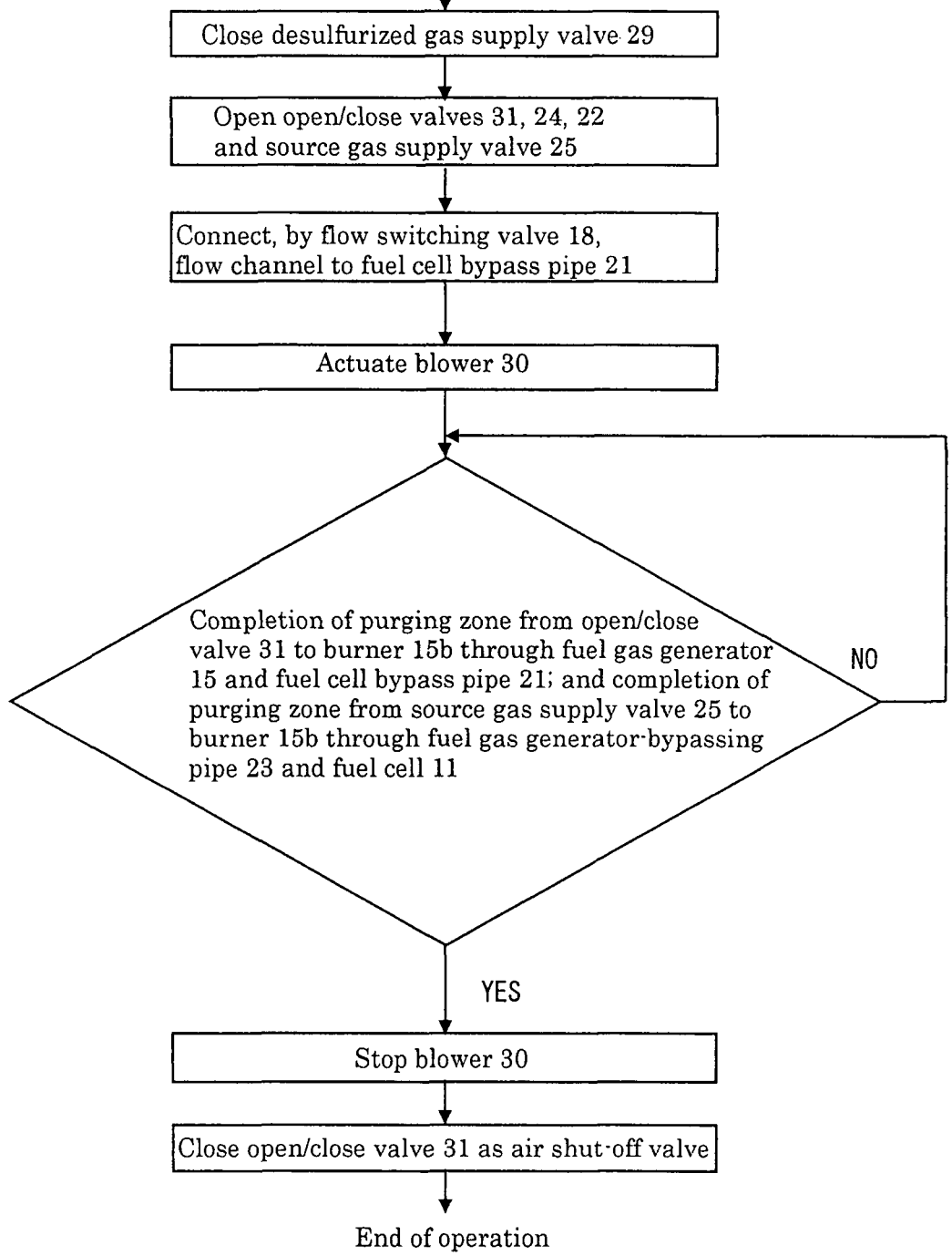
FIG. 18 is a flow chart showing another example of a process of stopping the operation of the system of fuel cell power generation according to EMBODIMENT MODE 6 of the present invention.

Next, another manner of a more effective purging process by air is described, using an example of operation of stopping the fuel cell power generation system according to the present EMBODIMENT MODE with reference to the fuel cell power generation system as shown in FIG. 16 and to a flow chart of a second specific example of the stopping operation as shown in FIG. 18. The desulfurized gas supply valve 29 is closed, after the ending of the purging, by the steam, of the inside atmosphere of the fuel gas generator 15 as well as the purging, by the desulfurized gas, of the atmosphere of the fuel gas flow channel of the fuel cell 11, at which the fuel electrode 11a is placed.

Thereafter, the open/close valves 31, 24 and 22 are opened, and the flow channel switching valve 18 is operated to connect the gas flow channel to the fuel cell bypass pipe 21. Subsequently, the blower 30 is actuated for flowing the air, on one hand, into the fuel gas generator 15, and then into the burner 15b via the fuel cell bypass pipe 21, and for flowing the air, on the other hand, into the fuel gas generator-bypassing pipe 23, and then into the burner 15b via the fuel electrode 11a of the fuel cell 11, thereby to purge the atmosphere of the whole of the fuel gas flow channel.

After this purging process is ended, the blower 30 is stopped, and the open/close valve 31 is closed, thereby to end the operation of the system. This purging process allows the system to simultaneously purge the inside atmosphere of the fuel gas generator 15 and the atmosphere of the fuel gas flow channel of the fuel cell at which the fuel electrode 11a is placed. Therefore, the total purging can be performed thereby in a short time. In other words, the combination of the structure of the fuel cell power generation system with the specific purging process according to the present EMBODIMENT MODE 6 has an effect of being able to realize ending of the purging by the air in a short time in addition to the effect already described at the outset of the present EMBODIMENT MODE 6.

It is to be noted here that during the purging process by air in the above EMBODIMENT MODEs 4 and 6, the air flows into or may possibly flow into the inside of the reactor 15a of the fuel gas generator 15 in the fuel cell power generation system. As a countermeasure thereto, it is effective that the reactor 15a of the fuel gas generator 15 comprises: a shifter 15d provided with a shifting catalyst having, as constituting materials, at least a noble metal and a metal oxide; and a reformer 15c, which is a hydrogen gas supplier for supplying a hydrogen gas containing, as auxiliary ingredients, carbon monoxide and steam as shown in FIG. 19.

Figure 19:
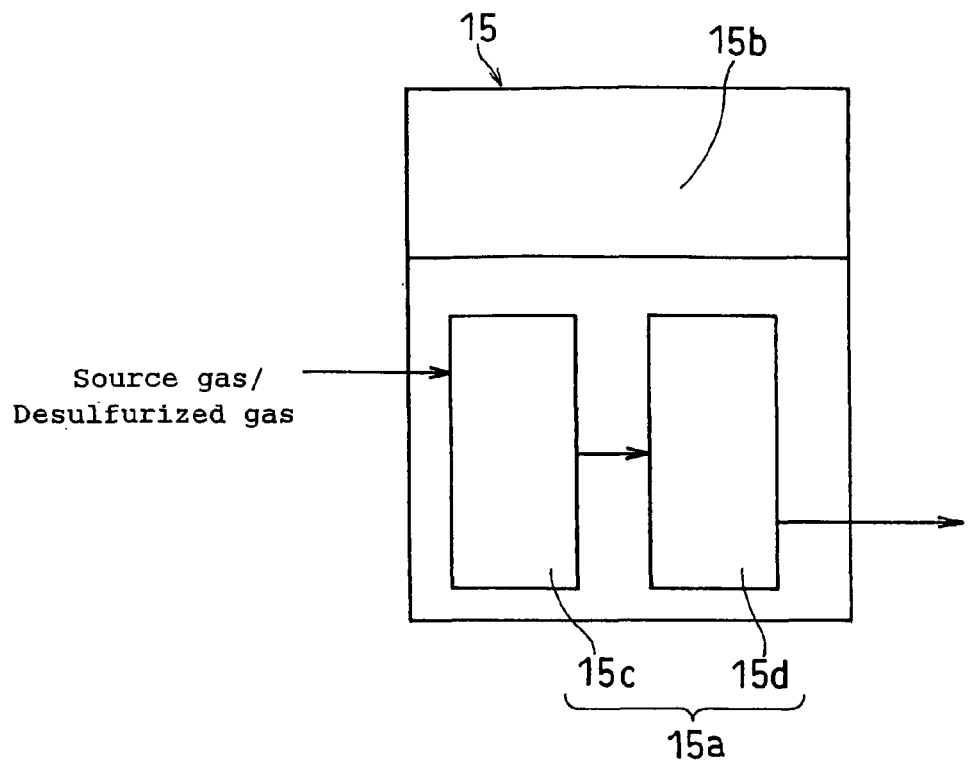
FIG. 19 is a diagram schematically showing an example of a fuel gas generator usable in respective EMBODIMENT MODEs.
Figure 20:
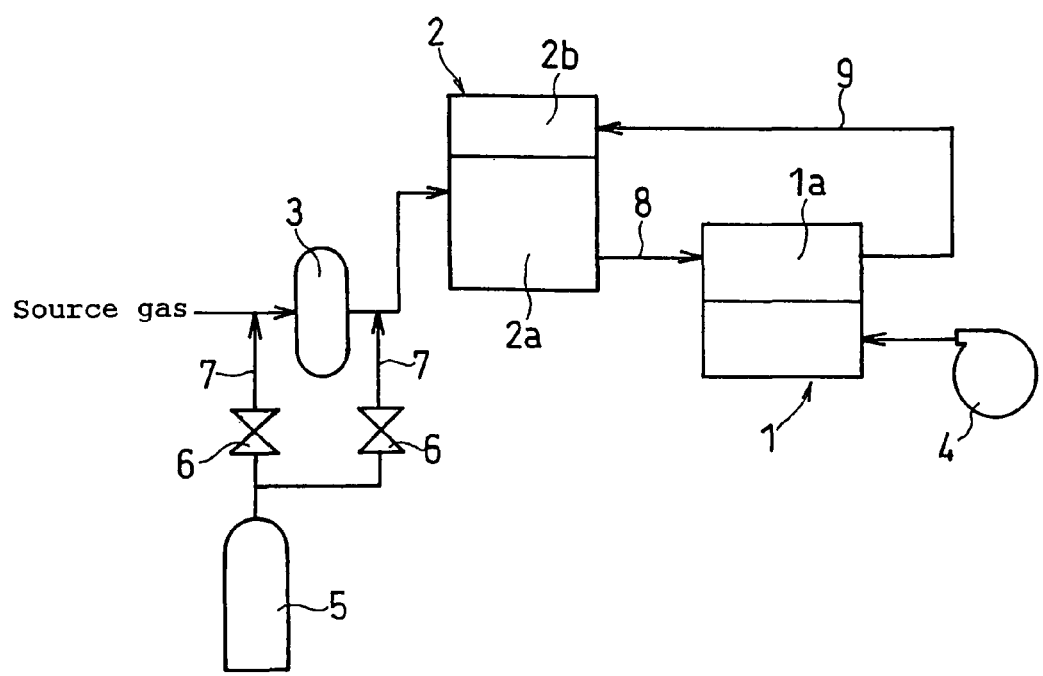
FIG. 20 is a diagram schematically showing an example of a system of fuel cell power generation according to prior art.

More specifically, with reference to FIG. 19, a source gas or a desulfurized gas is supplied to the reformer 15c, whereby in the reformer 15c, the source gas or the desulfurized gas is subjected to reforming reaction at a high temperature under the existence of steam. The carbon monoxide, as a by-product produced by the reforming reaction, is reacted with the steam in the shifter 15d provided at the next stage, thereby to produce hydrogen and carbon dioxide. The burner 15b has a function to heat the reformer 15c to a high temperature.

According to such arrangement, even if the purging process by the air allows the air to flow into the reactor 15a, deterioration of performance thereof due to the air can be prevented, since above described shifting catalyst has resistance to poisoning by oxygen.

Further, the systems or methods exemplified in the above EMBODIMENT MODEs 1 to 6 use a town gas as a gas for purging or a gas for source material. Since the town gases are widely provided as infrastructures, which do not necessitate the use of cylinders such as nitrogen cylinders. For such reason, the town gas is used in the above description as an example for realizing a simple structure of the system, and is subjected to the desulfurization process to make a desulfurized gas, with the sulfur content previously contained in the town gas having been removed, for a more effective gas for the purging process.

However, similar effects and results can be obtained by using therefor gases, such as methane gas, which have, as a main ingredient, a compound containing carbon and hydrogen such as hydrocarbon. If such gases are used, desulfurizers are not necessary, and moreover, the same source materials as to generate hydrogen can be used as gases for the purging. Other materials or gases than these town gases and methane gas, which are usable for producing source gases and/or gases for the purging process, are e.g. natural gas, propane gas and dimethyl ether gas.

As evident from the foregoing, according to the fuel cell power generation system or method of the present invention, at least at one of time periods before start of and after end of power generation, residual gas in a fuel gas flow channel at which a fuel electrode is placed can be removed by injecting a displacement gas into the fuel gas flow channel, thereby to displace the atmosphere of the fuel gas flow channel of the fuel cell by the displacement gas. Particularly in the case of a fuel cell provided with a fuel gas generating means, a source material having a compound of carbon and hydrogen as a main ingredient, which source material is the same material as the gas to be supplied to the fuel gas generating means, can be used for the displacement gas.

Further, in the case of a fuel cell power generation system or method provided with an air supply means, the atmosphere of the fuel gas flow channel of the fuel cell at which channel the fuel electrode is placed is firstly displaced by a displacement gas, and thereafter air is injected into the fuel gas flow channel by the air supply means, whereby the atmosphere of the fuel gas flow channel can be displaced by the air.

Furthermore, when the fuel gas generating means is allowed to continue its fuel gas generation until the injection of the displacement gas into the fuel gas flow channel is ended, stable burning by a burner can be realized in the fuel cell power generation system or method.

In the case of a fuel cell power generation system or method provided with a steam supply means, when the fuel gas generation by a fuel gas generating means is stopped, and a steam is injected by the steam supply means into the inside of the fuel gas generating means, after the injection of a displacement gas into a fuel gas flow channel of a fuel cell at which a fuel electrode is placed is ended, then residual fuel gas in the fuel gas generating means can be removed, and the inside atmosphere of the fuel gas generating means can be displaced by the steam.

Further, when after end of power generation by a fuel cell power generation system or method, the fuel gas generation by a fuel gas generating means is stopped, and a steam is injected into the inside of the fuel gas generating means, and further a displacement gas is injected into a fuel gas flow channel of a fuel cell at which a fuel electrode is placed, then residual fuel gas in the fuel gas generating means can be removed, and the inside atmosphere of the fuel gas generating means can be displaced by the steam, and furthermore residual fuel gas in the fuel gas flow channel can be removed, thereby to be able to displace the atmosphere of the fuel gas flow channel by the displacement gas. Necessary time for the two displacement processes can be shortened by simultaneously and independently performing the two displacement processes.

Still further, when an air is injected by an air supply means into both of a fuel gas flow channel of a fuel cell and a fuel gas generating means, after a displacement gas is injected into the fuel gas flow channel at which a fuel electrode is placed, and a steam is injected into the inside of the fuel gas generating means in order to thereby displace the respective atmospheres, then the atmosphere of the whole of the flow channel of the source material and the fuel within the system can be displaced by the air.

Furthermore, when the fuel gas generating means comprises a shifter provided with a shifting catalyst having, as constituting materials, a noble metal and a metal oxide, the shifting catalyst can be prevented from deteriorate in its performance, even if air flows into the inside of the fuel gas generating means during the displacement process by the air.

When a displacement gas continues to be injected into a fuel gas flow channel of a fuel cell in an arbitrary time interval selected from between start of operation of the fuel cell power generation system or method and start of power generation, then residual gas in the fuel gas flow channel at which a fuel electrode is placed can be removed and displaced by the displacement gas, and the fuel gas is prevented from diffusingly flowing into the fuel gas flow channel.

Further, when a source material continues to be injected into a fuel gas flow channel of a fuel cell via a bypass means, bypassing a fuel gas generating means, in an arbitrary time interval selected from between start of operation of the fuel cell power generation system or method and start of power generation, then residual gas in the fuel gas flow channel at which a fuel electrode is placed can be removed and displaced thereby, and the fuel gas is prevented from diffusingly flowing into the fuel gas flow channel.

Furthermore, when a source material or a displacement gas continues to be injected into a fuel gas flow channel at which a fuel electrode is placed until a value detected by a carbon monoxide density detecting means for detecting a carbon monoxide density thereof becomes lower than a predetermined value, then the fuel gas is prevented from diffusingly flowing into the fuel gas flow channel, and moreover, the amount of the source material or the displacement gas to be injected into the fuel gas flow channel can be appropriately controlled.

Besides, when a displacement gas used is such one that is free of sulfur content and has, as a main ingredient, a compound of carbon and hydrogen such as hydrocarbon, then the fuel cell power generation system or method can use, for the displacement gas, the same material as for the source material.

In addition, when a sulfur content removing means for removing sulfur content in a source material or a displacement gas is used, and when a town gas provided in an infrastructure is used for either one or both of the source material and the displacement gas, then the resultant fuel cell power generation system or method does not need e.g. cylinders, and can be of a simple arrangement.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A system of fuel cell power generation, comprising:
  a fuel cell having a fuel gas flow channel and a fuel electrode placed at an atmosphere of said fuel gas flow channel;
  a fuel gas supply means configured to supply a hydrogen-rich fuel gas to said fuel gas flow channel by connecting said fuel gas flow channel to said fuel gas supply means; and
  a displacement gas supply means configured to supply, to said fuel gas flow channel, a displacement gas having, as a main ingredient, a compound containing carbon and hydrogen,
  wherein said fuel gas supply means includes a fuel gas generating means configured to generate a hydrogen-rich fuel gas and a fuel gas supply pipe configured to connect said fuel gas flow channel and said fuel gas generating means,
  said fuel gas supply pipe is provided with a valve configured to control the supply of said hydrogen-rich fuel gas to said fuel gas flow channel,
  said displacement gas supply means is connected to said fuel gas supply pipe downstream of said valve,
  wherein said displacement gas supply means is configured to inject, via said fuel gas supply pipe, said displacement gas into said fuel gas flow channel before connecting said fuel gas flow channel to said fuel gas generating means by opening of said valve at start of power generation by said fuel cell, for displacing said atmosphere of said fuel gas flow channel by said displacement gas.

2. The system of fuel cell power generation according to claim 1, wherein said displacement gas is free of sulfur content.

3. A system of fuel cell power generation according to claim 1, further comprising a source material supply source configured to supply a source material having, as a main ingredient, a compound containing carbon and hydrogen to said fuel gas generating means, wherein
  said displacement gas supply means is a bypass pipe configured to connect said source material supply source and said fuel gas supply pipe, bypassing said fuel gas generating means, and
  said bypass pipe is configured to inject said source material into said fuel gas flow channel before connecting said fuel gas flow channel to said fuel gas generating means by opening of said valve at start of power generation by said fuel cell thereby to displace said atmosphere of said fuel gas flow channel by said source gas.

4. The system of fuel cell power generation according to claim 3, wherein said source material supplied from said source material supply source is a town gas having been made free of sulfur content.

5. An operation method of fuel cell power generation system, using a fuel cell having a fuel gas flow channel and a fuel electrode placed at an atmosphere of said fuel gas flow channel, and a fuel gas supply means configured to supply a hydrogen-rich fuel gas to said fuel gas flow channel,
  said fuel gas supply means includes a fuel gas generating means configured to generate a hydrogen-rich fuel gas and a fuel gas supply pipe configured to connect said fuel gas flow channel and said fuel gas generating means,
  said fuel gas supply pipe is provided with a valve configured to control the supply of said hydrogen-rich fuel gas to said fuel gas flow channel,
  said displacement gas supply means is connected to said fuel gas supply pipe downstream of said valve,
  the method comprising:
  a first displacement step of injecting, before connecting said fuel gas flow channel to said fuel gas generating means by opening of said valve at start of power generation by said fuel cell, a displacement gas having, as a main ingredient, a compound containing carbon and hydrogen, into said fuel gas flow channel from said displacement gas supply means via said fuel gas supply pipe, thereby to displace said atmosphere of said fuel gas flow channel by said displacement gas.

6. The operation method of fuel cell power generation system according to claim 5,
wherein said fuel cell power generation system includes a source material supply source configured to supply a source material having, as a main ingredient, a compound containing carbon and hydrogen to said fuel gas generating means,
said displacement gas supply means is a bypass pipe configured to connect said source material supply source and said fuel gas supply pipe, bypassing said fuel gas generating means, and
said first displacement step is a step of bypassing said fuel gas generating means and supplying said source material, in the form of a source gas, from a source material supply source, directly to said fuel gas flow channel thereby to displace said atmosphere of said fuel gas flow channel by said fuel gas.

7. A system of fuel cell power generation, comprising:
a fuel cell having a fuel gas flow channel and a fuel electrode placed at an atmosphere of said fuel gas flow channel;
a fuel gas supply means configured to supply a fuel gas to said fuel gas flow channel; and
a displacement gas supply means configured to supply, to said fuel gas flow channel, a displacement gas having, as a main ingredient, a compound containing carbon and hydrogen,
wherein said fuel gas supply means includes a fuel gas generating means configured to generate a hydrogen rich fuel gas from a source material having, as a main ingredient, a compound containing carbon and hydrogen,
said displacement gas supply means is a bypass means configured to supply said source material from a source material supply source to said fuel gas flow channel in the form of a source gas, bypassing said fuel gas generating means, and
said bypass means is configured to inject said source gas into said fuel gas flow channel via said bypass means before start of power generation by said fuel cell, thereby to displace said atmosphere of said fuel gas flow channel by said source gas.

8. The system of fuel cell power generation according to claim 7, wherein said displacement gas is free of sulfur content.

9. The system of fuel cell power generation according to claim 7, wherein said source material supplied from said source material supply source is a town gas having been made free of sulfur content.

10. An operation method of fuel cell power generation system, using a fuel cell having a fuel gas flow channel and a fuel electrode placed at an atmosphere of said fuel gas flow channel, the method comprising a first displacement step of injecting, before start of power generation by said fuel cell, a displacement gas having, as a main ingredient, a compound containing carbon and hydrogen, into said fuel gas flow channel thereby to displace said atmosphere of said fuel gas flow channel by said displacement gas,
wherein said fuel cell power generation system includes a fuel gas generating means configured to generate a hydrogen rich fuel gas from a source material having, as a main ingredient, a compound containing carbon and hydrogen, and
said first displacement step is configured to bypass said fuel gas generating means and supply said source material, in the form of a source gas, from a source material supply source, directly to said fuel gas flow channel thereby to displace said atmosphere of said fuel gas flow channel by said fuel gas.

* * * * *